(12) United States Patent
Joye

(10) Patent No.: US 12,143,467 B2
(45) Date of Patent: Nov. 12, 2024

(54) ENCRYPTED SCALAR MULTIPLICATION

(71) Applicant: ZAMA SAS, Paris (FR)

(72) Inventor: Marc Joye, Saint Zacharie (FR)

(73) Assignee: ZAMA SAS, Paris (FR)

( * ) Notice: Subject to any disclaimer, the term of this patent is extended or adjusted under 35 U.S.C. 154(b) by 0 days.

(21) Appl. No.: 18/547,421

(22) PCT Filed: Feb. 15, 2022

(86) PCT No.: PCT/EP2022/053685
§ 371 (c)(1),
(2) Date: Aug. 22, 2023

(87) PCT Pub. No.: WO2022/179891
PCT Pub. Date: Sep. 1, 2022

(65) Prior Publication Data
US 2024/0048355 A1 Feb. 8, 2024

(30) Foreign Application Priority Data

Feb. 26, 2021 (EP) ...................................... 21290010

(51) Int. Cl.
*H04L 9/00* (2022.01)

(52) U.S. Cl.
CPC .................................. *H04L 9/008* (2013.01)

(58) Field of Classification Search
CPC .......... H04L 9/008; H04L 9/3026; G06F 7/49
See application file for complete search history.

(56) References Cited

U.S. PATENT DOCUMENTS 11,196,539 B2 * 12/2021 Lauter ..................... H04L 9/088
2018/0041481 A1    2/2018 Paz De Araujo
2018/0294951 A1 * 10/2018 Paz de Araujo ...... H04L 9/0891
(Continued)

FOREIGN PATENT DOCUMENTS

CN    106452723    2/2017
CN    108718231    10/2018
(Continued)

OTHER PUBLICATIONS

Brakerski et al., (Leveled) Fully Homomorphic Encryption without Bootstrapping, 35 pages.
(Continued)

*Primary Examiner* — Meng Li
(74) *Attorney, Agent, or Firm* — NIXON & VANDERHYE P.C.

(57) ABSTRACT

Some embodiments are directed to a computer-implemented method (500) of determining a set of coefficients for homomorphically multiplying an encrypted value by a scalar. The encrypted value is represented by multiple respective value ciphertexts encrypting the value multiplied by respective powers of an even radix. The scalar multiplication is performed as a linear combination of the multiple respective value ciphertexts according to the set of coefficients. The set of coefficients are determined as digits of a radix decomposition of the scalar with respect to the radix. The determined digits lie between minus half the radix, inclusive, and plus half the radix, inclusive. It is ensured that no two subsequent digits are both equal in absolute value to half the radix.

25 Claims, 6 Drawing Sheets

(56) References Cited

U.S. PATENT DOCUMENTS

| | | | |
|---|---|---|---|
| 2020/0136798 A1 | 4/2020 | Kim et al. | |
| 2020/0403781 A1* | 12/2020 | Gentry | H04N 21/2353 |
| 2022/0094517 A1* | 3/2022 | Ghosh | H04L 9/008 |

FOREIGN PATENT DOCUMENTS

| | | |
|---|---|---|
| CN | 109412786 | 3/2019 |
| CN | 112199707 | 1/2021 |
| JP | 2017-067859 | 4/2017 |
| JP | 2018-522291 | 8/2018 |
| JP | 2019-528028 | 10/2019 |

OTHER PUBLICATIONS

Chillotti et al., Programmable Bootstrapping Enables Efficient Iomomorphic Inference of Deep Neural Networks, IACR, International Association for Cryptologic Research, Jan. 25, 2021, pp. 1-18, vol. 20210127:133406.

Chillotti et al., TFHE: Fast Fully Homomorphic Encryption over the Torus, 62 pages.

Joye M, Guide to Fully Homomorphic Encryption over the [Discretized] Torus, Zama, France: https://za.ma.ai, Oct. 14, 2021, 39 pages, Version 2.6.

Kim et al., Accelerating Number Theoretic Transformations for Bootstrappable Homomorphic Encryption on GPUs, arxiv.org, Cornell University Library, Dec. 3, 2020, 12 pages, 201 Olin Library Cornell University.

Yang et al., FPGA-Based Hardware Accelerator for Leveled Ring-LWE Fully Homomorphic Encryption, IEEE Access, Published Sep. 10, 2020, 18 pages, vol. 8.

International Search Report for PCT/EP2022/053685 mailed Jun. 15, 2022, 4 pages.

Written Opinion of the ISA for PCT/EP2022/053685 mailed Jun. 15, 2022, 7 pages.

Official Action, CN Application No. 202280016901.2, Jan. 18, 2024.

Search Report, CN Application No. 2022800169012, Jan. 18, 2024.

Notice of Reasons for Rejection, JP Application No. 2023-552030, Mar. 26, 2024.

* cited by examiner

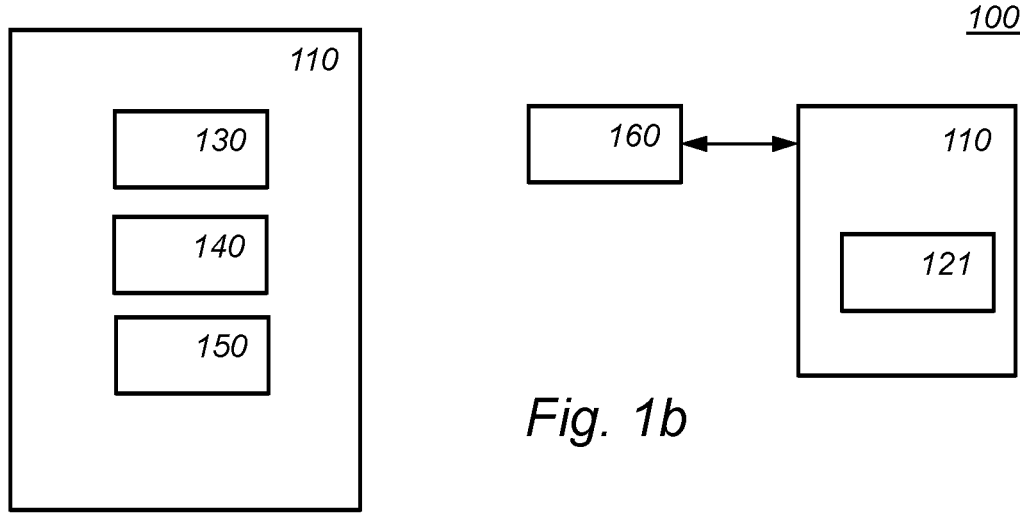
Fig. 1a
Fig. 1b
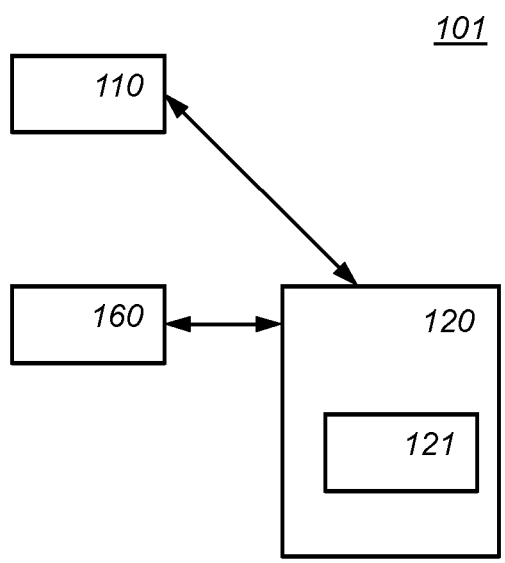
Fig. 1c

ENCRYPTED SCALAR MULTIPLICATION

This application is the U.S. national phase of International Application No. PCT/EP2022/053685 filed Feb. 15, 2022, which designated the U.S. and claims priority to EP patent application Ser. No. 21/290,010.4 filed Feb. 26, 2021, the entire contents of each of which are hereby incorporated by reference.

TECHNICAL FIELD

The presently disclosed subject matter relates to a computer-implemented method of determining a set of coefficients for use by an encrypted multiplication; to the use of such a method for key switching and for compiling a computation; to a device for determining a set of coefficients, and to a computer readable medium.

BACKGROUND

Homomorphic cryptography allows one to perform computations, e.g., evaluate circuits, over encrypted data without being able to decrypt. For example, input data and computation results may be received and returned in encrypted form. Intermediate data, e.g., an internal state of the computation, may also be in encrypted form.

Even though the result of the computation is returned in an encrypted form, when decrypted the output is the same as if the operations had been performed on the unencrypted data. Homomorphic encryption can be used for privacy-preserving outsourced storage and computation. This allows data to be encrypted and out-sourced to a cloud environment for processing and/or storage, all while encrypted.

For example, homomorphic cryptography may be applied in fields such as health care in which privacy regulations may make it difficult to share plain data, but computations on encrypted medical data may be allowable. For example, a medical model developed, say, to classify medical data may be configured to receive medical data from a third party, say a hospital, in encrypted form. The medical model might, e.g., classify medical data, e.g., as normal or abnormal, or as having some particular medical syndrome, disease, or other disorder. Using homomorphic encryption, the medical model may be applied to medical data that is received in encrypted form. This means that the party that offers the medical model does not have access to the plain medical data that corresponds to the encrypted medical data. The user of the service can decrypt the result of the medical model application.

Various popular homomorphic encryption schemes employ noise. For example, encryption of a data item may comprise mapping the data item to a point in a key-dependent lattice, to which some noise is added.

When a data item has just been encrypted the noise is low—the encryption is fresh. For example, the amount of noise is so low, that if a data item were to be decrypted, the noise can be removed at some point in the decryption process, e.g., by rounding. On the other hand, the noise should be high enough to make attacks on the system sufficiently hard. For example, in the hypothetical absence of noise, many homomorphic encryption schemes could be attacked with linear algebra, or other efficient algorithms, e.g., lattice-based algorithms. When a data item is encrypted, noise is added that is chosen so that attacks are hard while homomorphic operations can still be performed. Most homomorphic operations increase the noise that is inherent in an encrypted homomorphically encrypted data item. When many such operations are performed, the noise may reach a level that unique decryption is no longer possible. At that point, the scheme breaks down.

Generally speaking, two approaches have been developed in the art to deal with this phenomenon. The first is a levelled homomorphic encryption. A levelled homomorphic encryption can perform some number of operations one after the other. The levelled homomorphic encryption is designed such that the expected or worst-case noise at the end of such a number of operations is below a bound needed for exact decryption, or on any case causes only limited deviation to the decrypted plaintext. Thus, there is a limit to the number and the of operations that can be performed.

Another approach are so-called bootstrapping operations. A bootstrap operation is possible if the homomorphic encryption is strong enough to evaluate homomorphically the decryption algorithm in the encrypted domain—sometimes called a bootstrappable homomorphic encryption. A levelled homomorphic encryption scheme may be converted to an unlevelled homomorphic encryption scheme by performing bootstrap operations. The bootstrapping operation reduces noise in an encrypted data item. By means of a bootstrapping operation, noise in a ciphertext can be reduced to a fixed amount. A bootstrap operation increases the number of operations than can be performed on an encrypted data item or removes the limit altogether. Operations are performed and if the expected or worst-case noise in a ciphertext gets close to the level where unique decryption is no longer possible, bootstrapping is used to reduce the noise. Bootstrapping is typically computationally expensive; so it is advantageous to reduce the number of times it is done.

There is a need to reduce the increase in noise in a ciphertext caused by homomorphic operations in a homomorphic encryption scheme. When using levelled homomorphic encryption, an increase in noise due to a homomorphic operation limits what further operations can be performed on the ciphertext. When using unlevelled homomorphic encryption, an increase in noise limits what further operations can be performed before a bootstrapping operation is needed. In both cases, if a certain probability or degree of decryption errors is tolerated, this probability and the size of decryption errors increases with the increase in noise.

It is particularly important to reduce the noise increase due to scalar multiplication, e.g., due to the multiplication of an encrypted value by a known integer. This is a common operation of homomorphic computations, e.g., of applying a neural network to an encrypted input, say. Moreover, scalar multiplication is an important operation in key switching, e.g., in converting a homomorphic encryption under a source encryption key to a homomorphic encryption under a target encryption key. Key switching is often performed as part of bootstrapping.

In the context of key switching, "TFHE: Fast fully homomorphic encryption over the torus" by Ilaria Chillotti, Nicolas Gama, Mariya Georgieva, and Malika Izabachène, Journal of Cryptology, 33(1):34-91, 2020 (incorporated herein by reference) discloses to multiply an encryption of a key bit by a scalar value based on a radix decomposition of the scalar value, in this case, a binary decomposition with radix 2. The scalar value is written as a linear combination of powers of the radix. The encrypted key bit is represented by respective ciphertexts encrypting the key bit multiplied with respective powers of the radix. An encryption of the key bit multiplied by the scalar value is obtained by homomorphically computing a linear combination of the respective ciphertexts according to the set of coefficients. Thus, a multiplication with a single large scalar value is effectively replaced by respective multiplications with smaller scalars. An adaptation of this key switching technique using larger radices is provided in "Programmable Bootstrapping Enables Efficient Homomorphic Inference of Deep Neural Networks" by I. Chillotti et al. (incorporated herein by reference and available at https://eprint.iacr.org/2021/091/ 20210127:133406).

SUMMARY

According to one aspect of the invention, a computer-implemented method of determining a set of coefficients for use by an encrypted multiplication unit is provided, as defined by the claims. A corresponding device is also provided.

The inventor realized that, by improving the radix decomposition that is used to multiply an encrypted value by a scalar, the noise increase due to the scalar multiplication can be reduced. Typically, when determining a radix decomposition with radix B, digits are selected from an interval with size B. For odd B, for example, the interval [−(B−1)/2, (B−1)/2] can be used. For even B, an interval [−B/2,B/2 [or]−B/2+1,B/2] may be used, e.g. including minus half the radix or including plus half the radix. For example, "TFHE: Fast fully homomorphic encryption over the torus" uses a radix decomposition with a radix $B_g$ to determine a so-called gadget decomposition; in this case, the interval [−B/2, B/2[ is used, i.e., including minus half the radix but not plus half the radix. For key switching, the paper uses a binary decomposition, i.e., a radix decomposition with radix 2 and digits from the interval [0,1], i.e., an interval that includes half the radix but not minus half the radix.

Surprisingly, the inventor realized that, for even radix, it is beneficial to allow both plus half the radix and minus half the radix to be used in the same radix decomposition. This makes it possible to obtain a radix decomposition that further reduces noise in homomorphic scalar multiplications. Specifically, the inventor envisaged to determine the radix decomposition such that it is ensured that no two subsequent digits are both equal in absolute value to half the radix. Using the digits of such a radix decomposition in a scalar multiplication results in a less noisy ciphertext, so more homomorphic computations can be performed before the noise comes too large and/or bootstrapping is necessary. Conversely, given a number of desired operations to be performed before or without bootstrapping, less noise means the cryptosystem may be initialized with smaller parameters, e.g., a smaller modulus, leading to improved performance.

The provided radix decomposition is beneficial since it generally results in digits that are smaller in absolute value, e.g., the sum of square of the digits may be smaller. Generally, the larger in absolute value the digits of the radix decomposition, the larger the noise increase that results in multiplying by them. In that sense, having a digit that is equal in absolute value to half the radix represents a worst-case situation for that digit. However, this cannot always be avoided, e.g., if the scalar value is equal to half the radix modulo the radix, then the least significant digit of the radix decomposition has to be equal to plus or minus half the radix.

For two consecutive digits, the situation is different. Looking at a pair of digits both digits being equal in absolute value to half the radix represents a worst-case situation. However, when using an interval [−B/2, B/2[, i.e., when allowing half the radix but not plus half the radix, this cannot be avoided. It also cannot be avoided when using an interval]−B/2, B/2], i.e., when allowing plus half the radix but not minus half the radix. Surprisingly, however, the inventor realized that if both minus half the radix and plus half the radix are allowed, it becomes possible to ensure that two subsequent digits of the radix decomposition are never both equal in absolute value to half the radix. By ensuring this, a scalar multiplication with less noise can be achieved.

In some embodiments, determining the set of coefficients may comprise setting at least one digit of the radix decomposition to half the radix and setting at least one further digit of the radix decomposition to minus half the radix. That is, at least for some scalar inputs to which the radix decomposition procedure is applied, it may return a radix decomposition that contains both plus half the radix and minus half the radix. For other scalar inputs, a radix decomposition may be determined that contains only minus half the radix, only plus half the radix, or neither. When considered over possible inputs, being able to use both plus half the radix and minus half the radix in the same radix decomposition on average results in scalar multiplications with less noise.

In some embodiments, a digit of the radix decomposition may be selected from among plus half the radix and minus half the radix based on determining whether said selection results in a subsequent digit being equal in absolute value to half the radix. The inventor found that if one choice results in the subsequent digit being equal in absolute value to half the radix, then the other choice does not result in the subsequent digit being equal in absolute value to half the radix. Thus, it can be ensured locally that no consecutive digits equal in absolute value to half the radix occur. The decision whether to use plus or minus half the radix can be made while iteratively determining the radix decomposition, or while correcting an earlier made radix decomposition, for example.

In some embodiments, it may be further ensured that a digit that is equal in absolute value to half the radix, is succeeded by a next digit with the same sign as the digit. Here, the digits are considered to be ordered from least significant to more significant; thus, the next digit succeeding the digit is the next more significant digit, e.g., the coefficient for one power higher of the radix. Zero is considered to be a digit with the same sign. Another way of phrasing this condition is that the product of the digit and the next digit is greater than or equal to zero. This choice further helps to reduce noise. Plus half the radix followed by a positive next digit may be used to represent the same scalar as minus half the radix followed by that next digit plus one. The first choice is preferred since the next digit is smaller in absolute value. Similarly, minus half the radix followed by a negative next digit may be used or plus half the radix followed by the next digit minus one, with the first option being having a smaller absolute value for the next digit.

There are various ways in which radix decompositions as described herein may be determined. One way is by iteratively constructing the radix decomposition. In some embodiments, the radix decomposition may be determined by determining a digit from a current scalar; determining a next scalar from the current scalar and the digit; and determining a radix decomposition of the next scalar. This allows to enforce the condition that no two subsequent digits are both equal in absolute value to half the radix particularly efficiently and/or that the next digit has the same sign has the preceding one when the latter is half the radix in absolute value. For example, the radix decomposition may be determined iteratively by initializing the current scalar to the scalar and repeatedly determining a digit of the radix decomposition from the current scalar; determining a next scalar from the current scalar and the digit; and updating the current scalar to the next scalar.

When determining a digit from a current scalar, the digit may be selected from among plus half the radix and minus half the radix, e.g., when the current scalar is equal to half the radix modulo the radix.

In some embodiments, this selecting may comprise selecting plus half the radix if selecting minus half the radix would result in the next scalar being equal to half the radix modulo the radix, and selecting minus half the radix if selecting plus half the radix would result in the next scalar being equal to half the radix modulo the radix. This way, it can be guaranteed that no two subsequent digits are both equal in absolute value to half the radix, thus leading to the advantageous radix decomposition.

In some embodiments, this selecting may comprise selecting plus half the radix if this results in the next scalar being smaller than half the radix modulo the radix, and selecting minus half the radix otherwise. This not only guarantees that no two subsequent digits are equal in absolute value to half the radix, but also that the next digit has the same sign as the digit.

However, it is not needed to iteratively determine the radix decomposition in this way. It is also possible, for example, to take a radix decomposition determined using known techniques, e.g., with only digits from [−B/2, B/2[, and correct this radix decomposition to ensure that no two subsequent digits are both equal in absolute value to half the radix and/or that the next digit has the same sign has the preceding one when the latter is half the radix in absolute value. Various examples and alternatives are described herein.

In some embodiments, the value ciphertexts are LWE-type ciphertexts, e.g., based on a cryptographic hardness assumption of a learning with errors-type problem, such as Learning With Errors (LWE), Generalized Learning With Errors (GLWE), Ring-LWE, Module-LWE, etc. The value ciphertexts can also be based on the Approx-GCD problem or the NTRU problem. Cryptosystems based on these kinds of assumptions typically have noisy ciphertexts, with the associated noise problems described above. More generally, the used ciphertexts may satisfy the property that homomorphically multiplying a noisy homomorphic ciphertext by a random scalar increases a noise variance of the noisy homomorphic ciphertext by a variance of the random scalar plus a square of an expected value of the random scalar. The techniques provided herein are particularly optimal for ciphertexts with this type of noise increase.

The provided techniques can also be applied to multiply non-noisy homomorphic ciphertexts by a scalar, e.g., Paillier ciphertexts and the like. In such cases, noise is not a problem but, since the determined coefficients are generally smaller, the provided techniques allow more efficient scalar multiplication.

In some embodiments, the radix is a power of two. Operations for computing the radix decomposition can be performed particularly efficiently in this case, e.g., division by the radix corresponds to a bit shift and the remainder corresponds to the least significant bits of the number. In other embodiments, however, the radix is not a power of two. As the inventor realized, the provided techniques also work in such cases.

In some embodiments, the radix is at least 4, at least 8, or at least 16, for example, a power of two of at least 4, at least 8, or at least 16. The larger the radix, the larger the gain that is achieved by determining the radix decomposition as described herein. Detailed examples of this are provided elsewhere in this specification.

In some embodiments, based on the determined radix decomposition, a homomorphic scalar multiplication of the encrypted value by the scalar may be carried out by homomorphically computing the linear combination of the multiple respective value ciphertexts according to the set of coefficients. Thus, the scalar multiplication is carried out with less noise. However, it is not needed that the radix decomposition is determined at the same moment or by the same device as the homomorphic scalar multiplication, as demonstrated by other examples provided herein.

In some embodiments, the encrypted value may be homomorphically multiplied by a polynomial. In such cases, radix decompositions may be determined of respective scalar coefficients of the polynomial, and these decompositions for the respective coefficients may be used for the homomorphic multiplication. In particular, such a homomorphic multiplication by a polynomial may involve at least a homomorphic multiplication of the encrypted value by the constant coefficient of the polynomial, e.g., the homomorphic multiplication may be a performed by performing respective homomorphic multiplications by the respective coefficients. For example, homomorphic multiplication by a polynomial may be part of a key switching, e.g., for the key switching to TRLWE ciphertexts of "TFHE: Fast fully homomorphic encryption over the torus" and variants thereof.

In some embodiments, the linear combination may be homomorphically computed by multiplying multiple respective value ciphertexts by respective coefficients from the set of coefficients. These multiplications may be performed at least in part in parallel. Thus, using a radix decomposition is not only beneficial from a noise development perspective, but also for increasing parallelizability of the computation. For example, the multiplications may be performed at least in part by a dedicated processing unit, preferably a GPU or a FPGA.

A further aspect of the invention relates to the use of the determined radix decomposition in a key-switching method for noisy homomorphic ciphertexts. The key-switching method may be used after bootstrapping a noisy homomorphic ciphertext, for example. In order to compute a target ciphertext that encrypts the same value as a source ciphertext but under a different key, respective encrypted key switching values are homomorphically multiplied by respective coefficients determined from the source ciphertext. The homomorphic scalar multiplication uses a radix decomposition computed as described herein. Thus, a target ciphertext is obtained with less noise. As a consequence, more and/or additional types of operations can be applied to the target ciphertext before a next bootstrapping, for example.

A further aspect of the invention relates to compiling a computation into a homomorphic executable that is executed, e.g., processed, by an encrypted computation engine and that causes the encrypted computation engine to perform the computation on noisy homomorphic ciphertexts. Such a computation may comprises multiplying a value by a scalar. As part of compiling the computation into the homomorphic executable, a radix decomposition of the scalar may be determined as described herein. The compiling may involve including one or more instructions for homomorphic scalar multiplying the encrypted value by the scalar in the homomorphic executable, wherein the instructions comprise the determined coefficients. Thus, the use of the determined representation may be hard-coded into the computation. This allows the computation to make use of the improved noise development properties due to the improved radix decomposition. Moreover, since it is already known at compile time that the improved radix decomposition is used, the compiler can determine the noise increase due to the scalar multiplication, and can thus for example determine an optimal moment in the computation to perform bootstrapping or otherwise optimize the computation based on this determined noise increase.

The radix decomposition, and homomorphic scalar multiplication, key switching, and compiling using it, may be applied in a wide range of practical applications. Such practical applications include the encrypted evaluation of software programs without having access to plain data. For example, one may evaluate medical diagnostic software on medical data without having actual access to said medical data.

Medical data may comprise a medical image. A medical image may comprise, e.g., multi-dimensional image data, e.g., to two-dimensional (2D), three-dimensional (3D) or four-dimensional (4D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer. Instead or in addition, the computer readable medium may store a homomorphic executable for performing a computation on noisy homomorphic ciphertexts compiled as described herein.

In an embodiment, the computer program comprises computer program code adapted to perform all or part of the steps of an embodiment of the method when the computer program is run on a computer. Preferably, the computer program is embodied on a computer readable medium.

BRIEF DESCRIPTION OF DRAWINGS

Further details, aspects, and embodiments will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1a schematically shows an example of an embodiment of a device for determining a set of coefficients;

FIG. 1b schematically shows an example of an embodiment of a homomorphic computation system;

FIG. 1c schematically shows an example of an embodiment of a homomorphic computation system;

REFERENCE SIGNS LIST

Figure 2A:
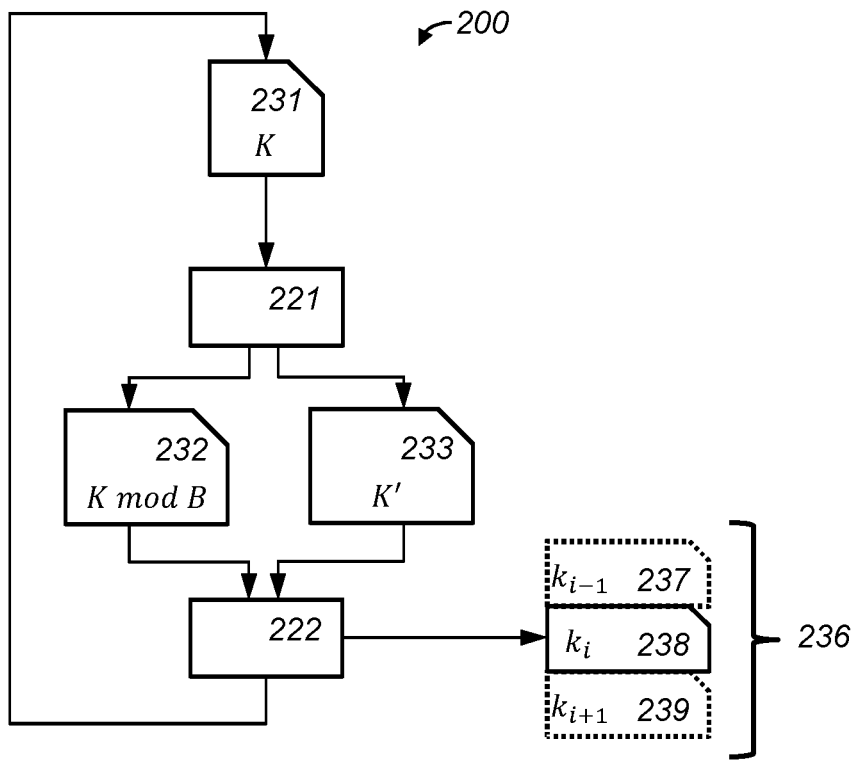
FIG. 2a schematically shows an example of an embodiment of a coefficient determining device.

The following list of references and abbreviations is provided for facilitating the interpretation of the drawings and shall not be construed as limiting the claims.

100, 101 an encrypted computation system
110 a coefficient determining device
120 a homomorphic computation device
121 an encrypted multiplication unit
130 a processor system
140 a storage
150 a communication interface
160 a data-provider system
200, 201 a coefficient determining device
221 a division unit
222 a digit determining unit
223 a radix decomposition unit
224 a decomposition correction unit
230 a scalar
231 a current scalar
232 a current scalar modulo the radix
233 a quotient of division by the radix
236, 240, 250 a radix decomposition
237-239, 241-246, 251-256 digits
310 if the current scalar modulo the radix is smaller than half the radix
315 setting the digit to the current scalar modulo the radix
320 if the current scalar modulo the radix is larger than half the radix
325 setting the digit to the current scalar modulo the radix minus the radix
330 if selecting minus half the radix would result in the next scalar being equal to half the radix modulo the radix
331 if selecting plus half the radix results in the next scalar being smaller than half the radix modulo the radix
335 selecting plus half the radix
340 if selecting plus half the radix would result in the next scalar being equal to half the radix modulo the radix
345 selecting minus half the radix 400 a homomorphic scalar multiplication device
421 a radix decomposition unit
422 an encrypted multiplication unit
423 a coefficient computing unit
424 a target ciphertext computation unit
430 a radix decomposition
431-433 digits
439 a scalar
440 an encrypted value
441-443 a value ciphertext
450 an encryption of the product of the encrypted value and the scalar
460 a source ciphertext
461-463 a coefficient for an encrypted key switching value
470 radix decompositions of coefficients
480 encrypted key switching values
490 a target ciphertext
500 determining coefficients
500' performing homomorphic multiplication by scalar
510 obtaining scalar, radix
520 determining coefficients
530 providing coefficients
540 homomorphically computing linear combination
600 performing key switching
610 obtaining key switching information
620 obtaining source ciphertext
630 determining coefficients
640 computing target ciphertext
700 compiling computation
720 including instruction
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DESCRIPTION OF EMBODIMENTS

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, the subject matter that is presently disclosed is not limited to the embodiments only, but also includes every other combination of features described herein or recited in mutually different dependent claims.

Various embodiments relate to determining a radix decomposition of a scalar with respect to a given radix. For illustration purposes, several radix decompositions are now discussed that do not have an even radix and/or that do not allow both plus half the radix and minus half the radix to be used as digits.

Let B be an integer $>1$. A positive integer $k<B^n$ may be expressed uniquely as $k=\Sigma_{i=0}^{n-1} k_i B^i$ with $0 \leq k_i < B$. In this case, integer B is referred to as the radix and integers $k_i$ are called the digits. A representation of k under radix B may be denoted $k=(k_{n-1}, \ldots, k_0)_B$ as the representation of k.

It is also possible to extend the digit set to $\{-(B-1), \ldots, B-1\}$. In such case, an integer k may be written in the form $$k=\Sigma_i k'_i B^i \text{ with} -B < k'_i < B.$$

Such a radix decomposition is sometimes referred to as a modified radix-B form for k. Modified radix-B forms are not unique. For example, $(2,2)_4=(1, -2,2)_4$ are two modified radix-4 forms for 10. For example, an integer may be recoded with digits in the set $\{-B_0, \ldots, B-1-B_0\}$ for any integer $0 \leq B_0 < B$.

When radix B is odd and $B_0 = \lfloor B/2 \rfloor$, a radix decomposition may be obtained that is also known as the balanced modified radix-B form. In this case, $B_0 = B-1-B_0$. In this case, the following algorithm can for example be used to determine a radix decomposition:

Algorithm. Balanced modified radix-B recoding (B odd)

Input: Integer $k \neq 0$
Output: $(k'_n, \ldots, k'_0)$ with $k'_i \in$ $$\left\{-\frac{B-1}{2}, \ldots, \frac{B-1}{2}\right\} \text{ s.t. } \Sigma_{i=0}^n k'_i B^i = k$$

K ← k; i ← 0
while [K ≠ 0] do
  $k'_i$ ← K mod B
  if [$k'_i$ > (B − 1)/2] then
    $k'_i$ ← $k'_i$ − B
  end if
  K ← (K − $k'_i$)/B
  i ← i + 1
return ($k'_{i-1}, \ldots, k'_0$)

A variant of the above algorithm may be used to obtain a radix decomposition with an even radix $B \geq 4$. This results in a modified radix-B representation, which is however not balanced. The so-obtained digits $k'_i$ belong to the set $$\left\{-\frac{B}{2}, \ldots, \frac{B}{2}-1\right\}.$$

Only minus half the radix is used as a digit but not plus half the digit. For some inputs, the algorithm returns a radix decomposition in which two subsequent digits are both equal to minus half the radix. For example, on input k=22 the algorithm returns $(1, -2, -2, -2)_4$.

Algorithm. Signed-digit radix-B recoding (B ≥ 4 even, only minus half the radix used)

Input: Integer $k \neq 0$
Output: $(k'_n, \ldots, k'_0)$ with $k'_i \in$ $$\left\{-\frac{B}{2}, \ldots, \frac{B}{2}-1\right\} \text{ s.t. } \Sigma_{i=0}^n k'_i B^i = k$$

K ← k; i ← 0
while [K ≠ 0]
  $k'_i$ ← K mod B
  if $\left[k'_i > \frac{B}{2}-1\right]$ then -continued Algorithm. Signed-digit radix-B recoding (B ≥ 4 even, only minus half the radix used)

$k'_i \leftarrow k'_i - B$
end if
$K \leftarrow (K - k'_i)/B$
$i \leftarrow i + 1$
return $(k'_{i-1}, \ldots, k'_0)$ FIG. 1a schematically shows an example of an embodiment of a device 110 for determining a set of coefficients for use by an encrypted multiplication unit.

The encrypted multiplication unit may be configured to homomorphically multiply an encrypted value by a scalar. The encrypted value may be represented by multiple respective value ciphertexts. A respective value ciphertext may be a noisy homomorphic ciphertext encrypting the value multiplied by a respective power of a radix. The encrypted multiplication unit may be configured to homomorphically compute a linear combination of the multiple respective value ciphertexts according to corresponding coefficients from the set of coefficients. The encrypted multiplication unit may be comprised in device 110 itself, e.g., may be implemented by a processor system of the device. In this case, the device 110 may be configured to carry out the homomorphic scalar multiplication. Device 110 may be a device for homomorphically multiplying an encrypted value by a scalar, e.g., a key switching device.

It is also possible that device 110 determines a set of coefficients suitable for such a homomorphic scalar multiplication, without performing the homomorphic scalar multiplication itself. Thus, the encrypted multiplication unit may also be external to the device 110. E.g., device 110 may be a compilation device for compiling a computation into a homomorphic executable, e.g., that may be later executed by device 110 or another device.

Device 110 may comprise a processor system 130, a storage 140, and a communication interface 150. Storage 140 may comprise local storage, e.g., a local hard drive or electronic memory. Storage 140 may comprise non-local storage, e.g., cloud storage. In the latter case, storage 140 may comprise a storage interface to the non-local storage. For example, storage 140 may be for storing a scalar and a radix. The radix may be even. Storage 140 may store additional information, such as a set of value ciphertexts representing an encrypted value, as also discussed elsewhere.

Device 110 may communicate internally, with other devices, external storage, input devices, output devices, and/or one or more sensors over a computer network. The computer network may be an internet, an intranet, a LAN, a WLAN, etc. The computer network may be the Internet. The device may optionally comprise connection interface 150 which is arranged to communicate with other devices as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna. Communication, e.g., internal communication, may use other communication protocols or media, e.g., an internal data bus.

In device 110, the communication interface 150 may be used to send or receive digital data. For example, device 110 may be configured to receive a set of value ciphertext representing an encrypted value, e.g., from a data-provider device. Device 110 may perform a homomorphic scalar multiplication of the encrypted value by a scalar. Device 110 may transmit the result of the homomorphic scalar multiplication, or a computation result based on it, to another device, e.g., the data-provider device or another device. As another example, device 110 may receive a description of a computation to be compiled and/or may transmit a homomorphic executable obtained by compiling this computation, e.g., by offering a compilation web service or the like.

The execution of device 110 may be implemented in a processor system 130, e.g., one or more processor circuits, e.g., microprocessors, examples of which are shown herein. Device 110 may comprise multiple processors, which may be distributed over different locations. For example, device 110 may use cloud computing.

Processor system 130 may be configured to determine the set of coefficients as digits of a radix decomposition of the scalar with respect to the radix. The determined digits may lie between minus half the radix, inclusive, and plus half the radix, inclusive. The determining may comprise ensuring that no two subsequent digits are both equal in absolute value to half the radix.

For example, the scalar may be a coefficient of a polynomial with which the encrypted value is to be multiplied. For example, processor system 130 may be configured to determine respective sets of coefficients for respective scalar coefficients of the polynomial. These sets of coefficients may be output, for example, as coefficients of respective polynomials with which the value ciphertexts are to be multiplied.

The set of coefficients may comprise multiple coefficients, for example, at least 5 or at least 10. Processor system 130 may be configured to determine a set of coefficients of a given maximal size, and accordingly only support scalars up to a given size, or can also be configured to allow arbitrary-sized scalars.

Processor system 130 may be further configured to provide the set of coefficients to an encrypted multiplication unit for homomorphically multiplying the encrypted value by the scalar. This can be done in many different ways. The encrypted multiplication unit may be comprised in device 110 itself, e.g., may be implemented by processor system 130. In this case, the set of coefficients may be provided via a bus, via internal communication, via an API call, via a storage, etc.

The set of coefficients can also be provided to an external encrypted multiplication unit, e.g., in the form of a homomorphic executable for execution by an encrypted computation engine. The set of coefficients can be made available to the encrypted multiplication unit, e.g., as part of such a homomorphic executable, by making it available to the encrypted multiplication unit in any kind of way. For example, the set of coefficients may be sent to a device or system comprising encrypted multiplication unit; or the set of coefficients may be put it on a storage accessible by a system or device comprising an encrypted multiplication unit.

For example, device 110 may be a compiler device that compiles computations into a homomorphic executable, in which case the device may provide the set of coefficients to an encrypted multiplication unit by including the set of coefficients into a homomorphic executable that may then be executed by any suitable encrypted computation engine comprising such an encrypted multiplication unit.

Some of the figures show functional units that may be functional units of the processor system. For example, a figure may be used as a blueprint of a possible functional organization of the processor system. The processor circuit (s) are not shown separate from the units in most figures. For example, the functional units shown in FIGS. 2a, 2b, 4a, 4b (see below) may be wholly or partially implemented in computer instructions that are stored at a device such as device 110, e.g., in an electronic memory of device 110, and are executable by a microprocessor of device 110. In hybrid embodiments, functional units are implemented partially in hardware, e.g., as coprocessors, e.g., arithmetic and/or cryptographic coprocessors, and partially in software stored and executed on device 110.

In some embodiments, device 110 may be configured to homomorphically multiply the encrypted value by the scalar by homomorphically computing the linear combination of the multiple respective value ciphertexts according to the set of coefficients. The computation of the linear combination may involve homomorphically multiplying the respective value ciphertexts by respective coefficients from the set of coefficients. The multiplications may be performed at least in part in parallel. For example, processor system 130 may comprise a dedicated processing unit (not shown), such as a GPU or a FPGA, to perform the homomorphic scalar multiplications or sub-operations of those homomorphic scalar multiplications, e.g., basic operations on tensors, matrices, vectors or scalars, etc.

For example, device 110 may be a device for performing a computation using homomorphic encryption cryptography. For example, the device 110 may be used to perform a computation on data, even though said data is received in encrypted form, e.g., from a data-provider.

The computation that is performed may comprise a scalar multiplication, e.g., a multiplication of an encrypted value by a scalar may be performed, corresponding to a multiplication of the value by the scalar in the computation. Instead or in addition, a scalar multiplication may be performed as part of a key switching operation in which a source ciphertext under a source encryption key is converted into a target ciphertext encrypting the same value but under a different target encryption key. Such a scalar multiplication thus does not correspond to a scalar multiplication of the computation but is implemented to enable the computation to be performed under encryption, e.g., it may be performed as part of or after a bootstrapping operation.

For example, storage 140 may store encrypted data items, e.g., received from one or more data-providers or generated as intermediate results or end results, e.g., outputs, of the computation. Typically, most or all data items on which the computation of device 110 is performed, are encrypted with a key (or keys) that is not known to device 110—that is device 110 may not be configured to obtain the plain data items corresponding to the encrypted data items, e.g., such as stored in storage 140. The decryption key in plain form is secret for device 110, though the encryption/decryption key may be available in encrypted form. For example, the processor system may be configured to perform a sequence of homomorphic encryption operations, which may include arithmetic operations on encrypted values such as addition and multiplication, but may also include arithmetic operations on encrypted polynomials. Homomorphic operations may also include operations like a key switching, a bootstrap, and the like.

FIG. 1b schematically shows an example of an embodiment of an encrypted computation system 100. System 100 is configured for performing a computation using homomorphic encryption, e.g., fully homomorphic encryption. In this example, the device that performs the scalar multiplication may also compute the set of coefficients.

The system 100 in this example comprises a data-provider device 160 and an encrypted computing device 110. Device 110 may be configured to receive encrypted data items from a data-provider 160. At least some data items may be received in encrypted form. Some data items may be received in plain format. The computation is run on the received data items and possibly also on stored data items. Interestingly, the computation may be performed on the encrypted data, without decrypting the data, e.g., without converting encrypted data items to data in a plain format.

The device 110 in this example may be based on device 110 of FIG. 1a, e.g., may comprise processor system 130, storage 140, and/or communication interface 150 of FIG. 1a. In this example, device 110 comprises an encrypted multiplication unit 121, e.g., implemented by a processor system of the device. As part of performing the encrypted computation, encrypted multiplication unit 121 may perform a homomorphic encryption of an encrypted value by a scalar. The encrypted value may be represented by value ciphertexts. To perform the multiplication by the scalar, device 110 may determine a set of coefficients as digits of a radix decomposition of the scalar, as also described elsewhere. Thus, a less noisy scalar multiplication is achieved.

For example, the value ciphertexts may be provided by the data-provider device 160 or may be derived from encrypted values provided by the data-provider device 160. The value ciphertexts may be key switching value ciphertexts for performing a key switching. These may be obtained from the data-provider device, from another device, or from storage, for example.

Although not shown in this figure, the encrypted computation system 100 may comprise multiple encrypted computing devices, e.g., three or more than three. The encrypted computation may be distributed among the multiple encrypted computing devices. The encrypted computing devices may exchange intermediate computation results, typically encrypted, among each other. Each encrypted multiplication device may be implemented like encrypted computing device 110, and may perform a scalar multiplication by determining a set of coefficients and using the coefficients to homomorphically multiply an encrypted vale by the scalar.

FIG. 1c schematically shows an example of an embodiment of an encrypted computation system 101. System 100 is configured for performing a computation using homomorphic encryption, e.g., fully homomorphic encryption. The example of FIG. 1c is based on that of FIG. 1b, and various considerations discussed with respect to that figure also apply here. A data-provider device 160 is shown based on data-provider device 160 of FIG. 1b. An encrypted computing device 120 is shown based on encrypted computing device 110 of FIG. 1b. As in FIG. 1b., the encrypted computing device may comprise an encrypted multiplication unit 121, e.g., implemented by a processor system of encrypted computing device 120.

Encrypted computing device 120 may perform an encrypted computation, including a scalar multiplication of an encrypted value, using an encrypted multiplication unit 121 as in FIG. 1b. In this example, the set of coefficients for performing a scalar multiplication are not determined by the encrypted computing device 120, but are instead determined by a compiler device 110. The compiler device may be based on device 110 of FIG. 1a, e.g., may include a processor system 130, storage 140, and/or communication unit 150 as described with respect to FIG. 1a.

The compiler device 110 may compile a computation into a homomorphic executable. The homomorphic executable may be a representation of the computation in terms of a set of instructions executable by an encrypted computation engine of the encrypted computing device 120. For example, a homomorphic representation may represent the computation in terms of a set of elementary instructions, e.g., scalar multiplications, additions, bootstrapping operations, etc. Execution of the homomorphic executable by the encrypted computing device 120 may result in the computation being performed on noisy homomorphic ciphertexts. Various representations for the homomorphic executable may be used that are known per se, e.g., Boolean circuits, arithmetic circuits, data flow graphs, or executable bytecode, may be used.

The computation may comprise one or more multiplications of values by scalars. For such a multiplication, the compiler device 110 may determine a set of coefficients as described herein. The compiler device 110 may include in the homomorphic executable one or more instructions for homomorphically multiplying the encrypted value by the scalar, e.g., one or more instructions causing the encrypted computation engine to perform the homomorphic scalar multiplication. The instructions may comprise the determined coefficients. As a result, encrypted computing device 120 may compute the scalar multiplication with less noise.

Referring to FIGS. 1b and 1c, homomorphic encryption schemes can be applied in many settings. For example, one or more encrypted computing devices 110, 120 may be operated by a cloud provider. The cloud provider may offer computation and storage services to its clients. By employing homomorphic encryption, data-provider 160 of FIG. 1b or 1c, e.g., a client of the cloud provider, can send their data in encrypted form. The cloud provider can still perform the required computations, and/or the required storage, but is not able to know the corresponding to plain data. For example, data-provider 160 may use an encryption key of a type corresponding to the particular homomorphic encryption system used, to encrypt the data items. When computations results are received by data-provider 160 from an encrypted computing device 110, 120, a corresponding decryption key may be used to decrypt the encrypted data items. Encryption and decryption keys may be the same—and typically are so.

For example, encrypted computation system 100, 101 may be configured to train machine-learning models, e.g., image classifiers, e.g., medical models, without the encrypted computing devices having access to the plain data items. For example, linear regression may be performed on the input data, possibly, even without bootstrapping. For example, backpropagation may be performed on the input data, possibly, with bootstrapping. The resulting model parameters may be returned to an entity who is in possession of the decryption key. This enables multiple providers of medical data to pool their data, by sending the data to a cloud provider. The cloud provider then returns the model parameters, without ever having access to the plain data. Encryption keys may be equal to decryption keys.

After the model is trained, the encrypted computation system 100, 101 may be used to offer the model, say, for use with medical data. This can be done with plain model parameters or encrypted model parameters—in both cases with encrypted data, e.g., encrypted input, intermediate and output data. Using plain model parameters is usually much more efficient. In both cases, an effect of the system is that a computation is performed, say an image classification, e.g., a medical image classification, without the computer knowing the plain data items. For example, a mammogram may be evaluated for cancer, without the image ever being in the plain at an encrypted computing device 110, 120 and without any encrypted computing device 110, 120, or a coalition of such devices, knowing what the outcome of the cancer evaluation is. From a privacy point of view it may be acceptable to operate a plain model on encrypted privacy sensitive data, while it might not be acceptable to operate on plain privacy sensitive data.

Other applications involve database services, e.g., looking up encrypted data in an encrypted database; for example, the computation may be a comparison between an input item and a database item. For example, multiple computations may be combined to produce a database index that matches an index. For example, the database, may be a genomic database, and the input a gene sequence. For example, system 100, 101 may be used for protected control of a device. For example, a device, even a large device such as a power plant, may send sensor values to an encrypted computing device 110, 120, and receive encrypted control signals in return. The control signals being computed from the sensor signals. An attacker of the system may be able to determine the contents of data going to and from one or more encrypted computing devices 110, 120, or even gain access to intermediate data of these devices, but he will not be helped by that as the data is encrypted. Even a full break of all encrypted computing devices 110, 120 of a system 100, 101, will not reveal the data, as the decryption key is not known to these devices. Computing the control signal may involve such mathematical operations as linear algebra, averages, matrix multiplication, polynomial evaluations, and so on, all of which are possible to execute with homomorphic encryption operations.

For example, a pool of encrypted data items may be maintained in the encrypted computation system; some of these may be received and some may be the result of an encrypted computation, e.g., intermediate results. For example, an encrypted computing device 110, 120 may be configured to apply a homomorphic encryption operation to one, two or more encrypted data items in a pool, e.g., a collection of input and/or intermediate and/or output values. The result may be a new encrypted data item that may be stored in the pool. The pool may be stored in a storage of the encrypted computation system. This may be local storage or a distributed storage. In the latter case, it may happen that one or more encrypted data items are represented multiple times in the pool. Encrypted data items may be sent from one computing device to another, e.g., if their values are needed elsewhere. The pool may be implemented in various ways, e.g., as a register file, an array, various data structure, and so on.

The ciphertexts are typically noisy homomorphic ciphertexts, e.g., encryption may involve a noise addition step. The amount of noise may change as homomorphic operations are applied. Decryption may involve a noise removal step that is guaranteed to return the correct plaintext, or approximately the correct plaintext, as long as the noise remains bounded. For example, in a homomorphic encryption scheme based on the Learning With Errors (LWE) problem, e.g., such as the FHE system on the Torus mentioned in the background, an encryption key may be a string of n digits $s_i$, e.g., bits; a ciphertext may be a tuple $(a_1, \ldots, a_n, b)$ with $b = \sum_{j=1}^{n} s_j \cdot a_j + \mu + e$. In the latter, + and respectively represents the addition of torus elements and a product between integers and torus elements, $a_i$ are n numbers, $\mu$ is the plain data item, and e is the noise, e.g., drawn from a probability distribution, e.g., a Gaussian distribution.

This scheme naturally extends to other mathematical structures, including based on polynomials. The numbers $s_i$, $a_i$, b, u, e may therefore be taken from a different mathematical structure. Not all encrypted data items need to be encrypted under the same key, and in fact re-encryptions with a different key is a possible homomorphic encryption operation. To convert from one key to another a so-called key-switching procedure may be used, which may use so-called key switching keys. Key-switching keys provided information how elements encrypted under a first key can be re-encrypted under a second key, without revealing either key.

The encrypted data items may represent all kinds of data. For example, encrypted data items may represent numbers that need to be averaged, or which are used for linear regression, etc. For example, the encrypted data items may represent an image. For example, each pixel of the image may correspond to one or more encrypted data items. For example, a grey-scale pixel may be represented by a grey level, which in turn may be represented by a single encrypted data item. For example, 256 grey levels may be encoded in a single encrypted data item. For example, a colour pixel may be represented as multiple colour levels, e.g., RGB levels, which in turn may be represented by a tuple of encrypted data items. For example, three 256-level colours may be encoded in three encrypted data items. How many encrypted data items are used to represent some type of data depends on the capacity of the homomorphic encryption scheme. For example, more restrictive homomorphic encryption schemes may only be capable of encoding one bit per encrypted data item. In that case, one colour pixel, may require 24 encrypted data items.

Although without access to the decryption key it may not be possible to say exactly how large the noise is, one can typically bound the noise, e.g., as the initial noise level is known for a fresh encryption and the noise increase for various operations are known. Noise increase may depend on the type of operation, e.g., addition versus multiplication, and on the other parameters if any. For example, a homomorphic encryption operation may be a scalar multiplication: a multiplication with a known, e.g., plain, value. For example, multiplication with a larger value may increase the noise more than multiplication with a smaller number. Exactly how much noise increases given the operations performed can be calculated mathematically, or could be estimated empirically. While some operations may add significant amounts of noise, others may not add noise, e.g., an addition with a plain constant.

A set of homomorphic encryption operations may be defined for the computation. For example, from the homomorphic encryption operations a network or circuit of operations may be built that together implement the computation, e.g., by compiler device 110 of FIG. 1c. For example, the operations may include Boolean operations. The operations may include at least one scalar multiplication. However, this is not needed to apply the techniques herein, e.g., a scalar multiplication may be applied as part of a key switching, in which the computation being performed does not need to also comprise scalar multiplications, or in which case such scalar multiplications do not need to be implemented according to the provided techniques. The way the homomorphic encryption operations are combined, e.g., which operation is applied to which operand in the pool, determines the computation that is being performed. For example, the computation may be represented as a list of homomorphic encryption operations that are to be performed together with an indication on which encrypted data item they are to be performed.

As operations are performed, the noise associated with the new computed (non-fresh) encrypted data items may grow. This is not a problem so long the noise stays within a limit needed for decryption. If more operations are to be performed, a bootstrapping operation can be performed. It is however desirable to limit the noise increase due to homomorphic operations and/or due to the bootstrapping itself, in order to increase the number of operations that can be performed before a bootstrapping or without a bootstrapping being needed at all.

Specifically, let Enc denote a homomorphic encryption scheme. In various settings it may be needed to evaluate $c \leftarrow k \cdot \text{Enc}(x)$ for a scalar k and a noisy homomorphic ciphertext Enc(x). It may be possible to directly compute $c \leftarrow k \cdot \text{Enc}(x)$, but this may result in a large increase in the noise of the ciphertext.

A smaller noise increase can be achieved if the encrypted value x is represented by a set of value ciphertexts, e.g., $\text{Enc}(B^i x)$, $0 \leq i \leq n$, being respective encryptions of the value x multiplied by respective powers $B^i$ of the radix B, e.g., precomputed by a data-provider or other party. The encrypted value may be multiplied by the scalar by computing a linear combination of the respective value ciphertexts according to a set of coefficients, e.g., $c \rightarrow \Sigma_{i=0}^n k'_i \text{Enc}(B^i x)$, where the scalar is equal to the corresponding linear combination of the powers of the radix, e.g., $k = \Sigma_{i=0}^n k'_i B^i$.

Various homomorphic encryption schemes satisfy the property that multiplying a noisy homomorphic ciphertext by a random scalar multiplicatively increases a noise variance of the noisy homomorphic ciphertext by a variance of the random scalar plus a square of an expected value of the random scalar. There are many homomorphic encryption schemes for which this is the case, e.g., LWE-type ciphertexts based on LWE, GLWE, Ring-LWE, Module-LWE or similar type of hardness assumptions; or ciphertexts based on the Approx-GCD or NTRU problems.

For a variable X, let $\mathbb{E}[X]$ and $\text{Var}(X)$ respectively denote its expectation and its variance. For example, assuming that the noise is centred and that its variance is bounded by the same threshold $\sigma^2$ in Enc(x) and $\text{Enc}(B^i x)$, the noise present in $c \leftarrow k \cdot \text{Enc}(x)$ may have a variance bounded by $(\text{Var}(k) + \mathbb{E}[k]^2)\sigma^2$. Computing the scalar multiplication as a linear combination $c \rightarrow \Sigma_{i=0}^n k'_i \text{Enc}(B^i x)$ may result in a noise whose variance is bounded by $(\Sigma_{i=0}^n (\text{Var}(k'_i) + \mathbb{E}[k'_i]^2))\sigma^2$. By definition the variance $\text{Var}(k'_i)$ satisfies $\text{Var}(k'_i) = \mathbb{E}[(k'_i - \mathbb{E}[k'_i])^2]$, which can be expanded into $\text{Var}(k'_i) = \mathbb{E}[k'^2_i] - \mathbb{E}[k'_i]^2$. Thus, the above noise variance bound for encrypted scalar multiplication by computing a linear combination, $(\Sigma_{i=0}^n (\text{Var}(k'_i) + \mathbb{E}[k'_i]^2))\sigma^2$, can be equivalently written as $(\Sigma_{i=0}^n \mathbb{E}[k'^2_i])\sigma^2$. It is thus desired to reduce this latter bound.

If the radix B is even, at first glance, from the point of view of reducing noise, it does not seem to make a difference whether a radix decomposition with a given radix uses coefficients equal to minus half the radix, plus half the radix, or both. In each case, the contribution $k'^2_i$ to the noise is the same. Interestingly, however, the inventor realized that allowing only plus half the radix, or allowing minus half the radix, results in suboptimal choices for the other digits as well, and thus to a suboptimal radix decomposition from the point of view of noise reduction. For example, with B=4, applied to k=22, using only minus half the radix results in a radix decomposition $(1, -2, -2, -2)_4$, whereas $(1,1,2)_4$ is better. Similarly, when only using plus half the radix, other scalars lead to suboptimal radix decompositions.

Thus, the inventor envisaged to augment the digit set to include both $$-\frac{B}{2} \text{ and } \frac{B}{2}:$$

scalars k may thus be decomposed with digits in $$\left\{-\frac{B}{2}, \ldots, \frac{B}{2}\right\}.$$

For at least some scalars, at least one digit of the radix decomposition may be set to minus half the radix, and at least one digit of the radix decomposition may be set to minus half the radix.

Interestingly, by using both minus half the radix and plus half the radix, it may be ensured that that no two subsequent digits are both equal in absolute value to half the radix. Ensuring this generally results in a noise reduction and thus a less noisy homomorphic scalar multiplication. It can also optionally be ensured that a digit that is equal in absolute value to half the radix, is succeeded by a next digit with the same sign as the digit. Also this requirement by itself is beneficial because it results in a noise reduction. It is particularly beneficial in combination with ensuring that no subsequent digits are equal in absolute value to half the radix. It is thought that a radix decomposition satisfying both properties is optimal in terms of noise reduction.

A radix decomposition satisfying the above properties may be referred to as being a balanced non-adjacent form. In particular, mathematically, given an even radix B, a modified radix-B representation $(k'_n, \ldots, k'_2, k'_1, k'_0)$ for an integer k may be defined as being a balanced non-adjacent form (BNAF) if and only if, for all i, $$|k'_i| \leq \frac{B}{2}; \qquad 1.$$

$$|k'_i \cdot k'_{i+1}| \leq \frac{B}{2}\left(\frac{B}{2} - 1\right); \text{ and} \qquad 2.$$

$$k'_i \cdot k'_{i+1} \geq 0 \text{ when } |k'_i| = \frac{B}{2}. \qquad 3.$$

Various detailed examples are described below of determining radix decompositions that satisfy some or all of the above properties.

FIG. 2a schematically shows an example of an embodiment of a coefficient determining device 200, e.g., based on device 110 of any of FIGS. 1a-1c. Device 200 may determine a set of coefficients for use by an encrypted multiplication unit as digits of a radix decomposition with respect to an even radix.

The device 200 of this figure may determine the set of coefficients in an iterative way, going from least significant to most significant. Given a current scalar K, 231, device 200 determines a current digit $k_i$, 238 of the radix decomposition 236. Based on the current scalar 231 and the digit 238, a next scalar is determined for which a radix decomposition is then determined. For example, the current scalar K may be updated to the next scalar, after which the procedure may be repeated. By initializing the current scalar 231 to the scalar to be decomposed and repeatedly determining current digits 237, 238, 239, etc, a radix decomposition 236 of the scalar may be obtained.

To determine the current digit 238 from the current scalar K 231, coefficient determining device 200 may employ a division unit 221 configured to compute the value K mod B, 232, of the current scalar modulo the radix, in other words, a remainder of dividing by the radix. In this example, the remainder 232 is represented as a value 0≤K mod B<B, e.g., in the interval [0,B−1], but any other interval of the same size, e.g., $$\left[-\frac{B}{2}, \frac{B}{2} - 1\right],$$

[−1, B−2], etc, may be used as well.

Apart from computing value 232, the division unit 221 may also compute a quotient 233 of dividing the current scalar 231 minus the remainder 232 by the radix, e.g., K'=(K−(K mod B))/B. The quotient 233 may represent the next scalar, e.g., the remaining value for which to determine a radix decomposition in the next iteration.

If the radix is a power of two, then division unit 221 can be implemented particularly efficiently, e.g., value 232 may correspond to the least significant bits of current scalar K and value 233 may correspond to the most significant bits.

A digit determining unit 222 may be configured to determine the current digit 238 from the remainder 232 and the quotient 233.

Figure 3A:
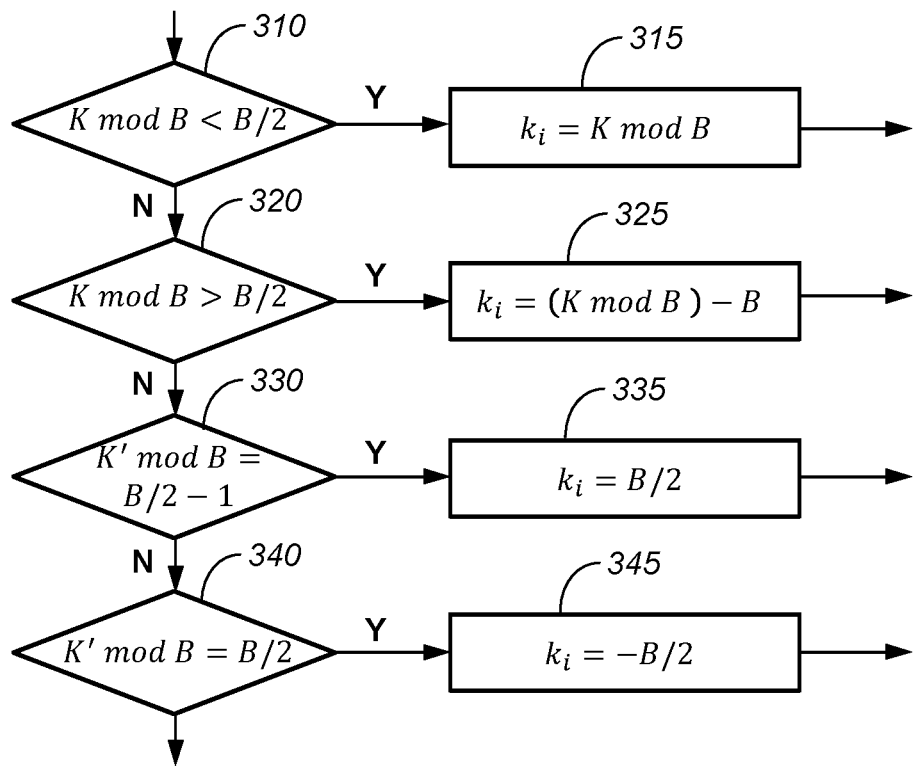
FIG. 3a schematically shows an example of an embodiment of method of determining a digit of a radix composition from a current scalar.
Figure 3B:
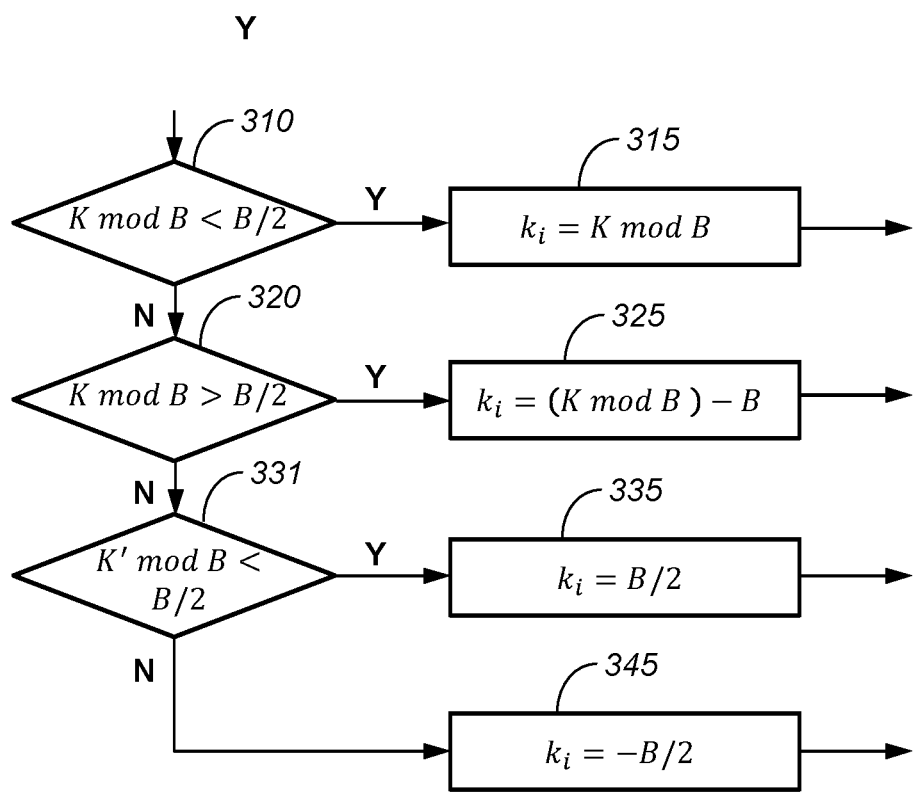
FIG. 3b schematically shows an example of an embodiment of method of determining a digit of a radix composition from a current scalar.

Two examples of embodiments of methods that digit determining unit may apply to determine current digit $k_i$ from remainder K mod B and quotient 233 are shown in FIGS. 3a and 3b, respectively.

If the remainder K mod B is not equal to half the radix, then there is generally only one possible choice for the current digit $k_i$. If the remainder K mod B is smaller than half the radix, then the current digit may be set to the remainder itself, as illustrated by steps 310, 315 of FIGS. 3a and 3b. The next scalar may then be set to the quotient K'. If the remainder K mod B is larger than half the radix, then the current digit may be set to the remainder minus the radix, as illustrated by steps 320, 325 of FIGS. 3a and 3b. The next scalar may then be set to the quotient plus one.

If the remainder K mod B is equal to half the radix, then digit $k_i$ may be selected from among plus half the radix and minus half the radix. Interestingly, a decision criterion is used that results in plus half the radix being used in at least some cases, and minus half the radix being used in at least some other cases. In particular, the digit $k_i$ may be selected based on determining whether or not this selection results in the subsequent digit being equal in absolute value to half the radix. It can be ensured that this is not the case, leading to a radix decomposition with beneficial noise characteristics.

In particular, as illustrated by FIG. 3a, plus half the radix may be selected, 335, if selecting minus half the radix would result in the next scalar being equal to half the radix modulo the radix. This may be the case if the quotient K' modulo the radix is equal to B/2−1, 330: in this case, selecting minus half the radix would result in the next scalar being equal to the quotient plus one so being equal to B/2 modulo the radix.

Similarly, minus half the radix may be selected, 345, if selecting plus half the radix would result in the next scalar being equal to half the radix modulo the radix, 340. This may be the case if the quotient K' modulo the radix is equal to B/2, 340: in this case, selecting plus half the radix would result in the next scalar being equal to the quotient so being equal to B/2 modulo the radix.

Generally, if neither selecting minus half the radix nor selecting plus half the radix would result in the next scalar being equal to half the radix modulo the radix, then from the point of view of avoiding subsequent digits equal to B/2, either choice may be made. FIG. 3a does not specify this, but it would be possible e.g. to always select B/2 or to always select −B/2 in such cases.

A particularly beneficial choice is to ensure that a digit that is equal in absolute value to half the radix, is succeeded by a next digit with the same sign as the digit. This is illustrated in FIG. 3b. As illustrated in this figure, plus half the radix may be selected, 335, if this results in the next scalar being smaller than half the radix modulo the radix, in particular, if the quotient modulo the radix is smaller than half the radix, 331. Otherwise, minus half the radix may be selected, 345. This decision procedure may result in a balanced non-adjacent form. It is noted that decision 331 of FIG. 3b results in the same selection for the digit as decisions 330 and 340 of FIG. 3a; in that sense, the decision procedure of FIG. 3b is a more specific version of the decision procedure of FIG. 3a.

A detailed example of an algorithm to determine a radix decomposition is now given. This algorithm implements the decision procedure of FIG. 3b and results in a balanced non-adjacent form:

---

Algorithm. Radix-B recoding resulting in a BNAF (B even)

Input: Integer $k \neq 0$
Output: $(k'_n, \ldots, k'_0)$ with $k'_i \in \left\{-\frac{B}{2}, \ldots, \frac{B}{2}\right\}$ s.t. $\sum_{i=0}^{n} k'_i B^i = k$ $K \leftarrow k; i \leftarrow 0$
while $[K \neq 0]$
  $k'_i \leftarrow K \bmod B; K \leftarrow (K - k'_i)/B$
  if $\left[k'_i > \frac{B}{2}\right] \vee \left[\left[k'_i = \frac{B}{2}\right] \wedge \left[(K \bmod B) \geq \frac{B}{2}\right]\right]$ then
    $k'_i \leftarrow k'_i - B; K \leftarrow K + 1$
  end if
  $i \leftarrow i + 1$
end while
$(k'_{i-1}, \ldots, k'_0)$

---

This algorithm processes the digits from, from least significant to most significant, e.g., from right to left. It makes use of a temporary register K that represents the current scalar and is initialized to k. The successive digits $k'_i$ are given by the absolute smallest residue of K modulo B, namely, $k'_i \equiv K \pmod{B}$ and $k'_i \in$ $$\left\{-\frac{B}{2}, \ldots, \frac{B}{2}\right\}).$$

Since $$-\frac{B}{2} \equiv \frac{B}{2} \pmod{B},$$

the case $$K \equiv \pm \frac{B}{2}$$

(mod B) requires a special treatment. Digits $$\frac{B}{2} \text{ and } -\frac{B}{2}$$

have the same magnitude. The choice between the two relies on the following observation:

$$\left\lfloor \frac{K \bmod B^2}{B} \right\rfloor B + \frac{B}{2} \equiv \left(\left\lfloor \frac{K \bmod B^2}{B} \right\rfloor + 1\right) B - \frac{B}{2} \pmod{B^2}.$$

If $$\left\lfloor \frac{K \bmod B^2}{B} \right\rfloor < \frac{B}{2}$$

then $k'_i$ is set to $$\frac{B}{2};$$

otherwise, $k'_i$ is set to $$-\frac{B}{2}.$$

Note that in this latter case, $$\left\lfloor \frac{K \bmod B^2}{B} \right\rfloor + 1 > \frac{B}{2} \Leftarrow B - \left(\left\lfloor \frac{K \bmod B^2}{B} \right\rfloor + 1\right) < \frac{B}{2}.$$

It may be noted that in all cases, if $$|k'_i| = \frac{B}{2}$$

then $$|k'_{i+1}| < \frac{B}{2}.$$

It can also be observed that if $$k'_i = \frac{B}{2}$$

then $k'_{i+1} \geq 0$ and if $$k'_i = -\frac{B}{2}$$

then $k'_{i+1} \leq 0$. Thus, the algorithm determines a balanced non-adjacent form.

It will be noted that the algorithm can readily be extended to cover the case k=0 by returning (0) on input k=0.

A detailed analysis will now be given of the noise properties of using a radix decomposition determined according to FIG. 3b or according to the algorithm provided above. The analysis is given in terms of the notation of the algorithm, but is believed to also apply to other radix decompositions in BNAF form with an even radix.

In the above, algorithm, if $k'_i=K \bmod B$ then $(K-k'_i)/B = \lfloor K/B \rfloor$. Hence, the output value of $k'_i$ at each iteration may be completely determined by the current values of $K \bmod B$ and of $\lfloor K/B \rfloor \bmod B$. A pair of digits (e, d) is therefore sufficient to describe each possible case.

Some notation is now introduced. Define the quantities $K_i$ that keep track of successive values of K entering the loop at iteration i, and represent $K_i \bmod B^2$ as the pair $(e_i, d_i)$ with $0 \leq d_i, e_i < B$ such that $K_i \bmod B^2 = e_i B + d_i$. By construction, we have $$\begin{cases} K_0 = k \\ K_{i+1} = \dfrac{K_i - k'_i}{B} \end{cases} \text{ for } 0 \leq i \leq n-1.$$

Depending on the values of $K_i \bmod B^2 = (e_i, d_i)$, there are different cases to consider. This is detailed in the following table, showing output digit $k'_i$ according to the pair $(e_i, d_i)$.

| Case | $(e_i, d_i)$ | $k'_i$ | $(e_{i+1}, d_{i+1})$ |
|---|---|---|---|
| 1. | $\begin{cases} 0 \leq d_i < \frac{B}{2} \\ 0 \leq e_i < B \end{cases}$ | $d_i$ | $(*, e_i)$ |
| 2. | $\begin{cases} d_i = \frac{B}{2} \\ 0 \leq e_i < \frac{B}{2} \end{cases}$ | $\frac{B}{2}$ | $(*, e_i)$ |
| 3. | $\begin{cases} d_i = \frac{B}{2} \\ \frac{B}{2} \leq e_i < B \end{cases}$ | $-\frac{B}{2}$ | $(*, (e_i + 1) \bmod B)$ |
| 4. | $\begin{cases} \frac{B}{2} < d_i < B \\ 0 \leq e_i < B \end{cases}$ | $d_i - B$ | $(*, (e_i + 1) \bmod B)$ |

For the last column, remark that the knowledge of $(e_i, d_i)$ only enables to obtain $d_{i+1}$. We have $d_{i+1} = K_{i+1} \bmod B =$ $\dfrac{(K_i - k'_i) \bmod B^2}{B} = \dfrac{e_i B + d_i - k'_i}{B} (\bmod B) = \begin{cases} e_i & \text{if } k'_i = d_i \\ e_i + 1 (\bmod B) & \text{if } k'_i = d_i - B \end{cases}$.

Remark also that if the radix-B digits forming k are uniformly random over $\{0, \ldots, B-1\}$ then so is $e_{i+1}$; in other words, $e_{i+1}$ can take any value in $\{0, \ldots, B-1\}$ with a probability of $\dfrac{1}{B}$.

The corresponding Markov matrix P where element (i,j) denotes the probability for transitioning from case i to case j ($1 \leq i, j \leq 4$) is given by $$P = \begin{pmatrix} \frac{1}{2} & \frac{1}{2B} & \frac{1}{2B} & \frac{B-2}{2B} \\ \frac{1}{2B} & 0 & 0 & 0 \\ \frac{2}{B} & 0 & 0 & \frac{B-2}{B} \\ \frac{1}{2} & \frac{1}{2B} & \frac{1}{2B} & \frac{B-2}{2B} \end{pmatrix}.$$

The companion stationary probability vector $\vec{\pi} = (\pi_1, \pi_2, \pi_3, \pi_4)$ satisfies $\vec{\pi} P = \vec{\pi}$ subject to $\Sigma_{1 \leq j \leq 4} \pi_j = 1$. We find $$\vec{\pi} = \left( \frac{B^2 + B + 2}{2B(B+1)}, \frac{1}{2(B+1)}, \frac{1}{2(B+1)}, \frac{B-2}{2B} \right).$$

The occurrence probability of each digit may be determined as follows. Let $B \geq 2$ be an even integer. Then a digit $$k'_i \in \left\{ -\frac{B}{2}, \ldots, \frac{B}{2} \right\}$$

from a uniformly random BNAF form as per the above algorithm follows the following distribution $$Pr[k'_i = d] = \begin{cases} \dfrac{B+2}{B+1} \dfrac{1}{B} & \text{if } d = 0 \\ \dfrac{1}{2(B+1)} & \text{if } d \in \left\{ -\frac{B}{2}, \frac{B}{2} \right\} \\ \dfrac{1}{B} & \text{otherwise} \end{cases}.$$

This may be realized as follows. Excluding the digit $d_i=0$, Cases 1 and 2 in the table are symmetric. We so deduce $\pi_1 = Pr[k'_i = 0] + \pi_4$ and thus $$Pr[k'_i = 0] = \frac{B^2 + B + 2}{2B(B+1)} - \frac{B-2}{2B} = \frac{B+2}{B(B+1)}.$$

From the table, we also get $$Pr\left[k'_i = \frac{B}{2}\right] = \pi_2 = \frac{1}{2(B+1)} \text{ and } Pr\left[k'_i = -\frac{B}{2}\right] = \pi_3 = \frac{1}{2(B+1)}.$$

For the remaining case $$\left( \text{i.e., } d \notin \left\{ -\frac{B}{2}, 0, \frac{B}{2} \right\} \right),$$

we infer from Cases 1 and 2 in the table (excluding 0) that every digit is equiprobable and thus $$(\pi_1 - Pr[k_i' = 0]) + \pi_4 =$$

$$(B-2)Pr\left[k_i' = d \mid d \notin \left\{-\frac{B}{2}, 0, \frac{B}{2}\right\}\right] \Leftarrow Pr\left[k_i' = d \mid d \notin \left\{-\frac{B}{2}, 0, \frac{B}{2}\right\}\right] =$$

$$\frac{2\pi_4}{B-2} = \frac{1}{B}.$$

As a corollary, the following may be derived. Let $B \geq 2$ be an even integer. Then a digit $k'_i$ in a uniformly random BNAF form as per the above algorithm satisfies $$\mathbb{E}[k_i'] = 0 \text{ and } \text{Var}(k_i') = \frac{1}{12} \frac{(B+2)(B^2 - B + 1)}{B+1}.$$

This may be realized by using the identity $$\sum_{t=1}^{T} t^2 = \frac{1}{6} T(T+1)(2T+1).$$

From its definition, since $$\mathbb{E}[k_i'] = \sum_{-\frac{B}{2} \leq d \leq \frac{B}{2}} Pr[k_i' = d]d = 0,$$

the variances is given by $$\text{Var}(k_i') = \sum_{-\frac{B}{2} \leq d \leq \frac{B}{2}} Pr[k_i' = d]d^2 =$$

$$2 \sum_{d=1}^{\frac{B}{2}} Pr[k_i' = d]d^2 = 2 \frac{1}{B} \sum_{d=1}^{\frac{B}{2}-1} d^2 + \frac{1}{B+1} \left(\frac{B}{2}\right)^2 =$$

$$\frac{1}{12}(B-1)(B-2) + \frac{1}{4} \frac{B^2}{B+1} = \frac{(B+2)(B^2 - B + 1)}{12(B+1)}.$$

The above analysis shows that the radix decomposition provides better noise control in homomorphic encryption schemes. For various homomorphic encryption schemes, it is beneficial in terms of noise control to reduce the value of $\text{Var}(k'_i) + \mathbb{E}[k'_i]^2$. The above analysis implies that, for BNAF radix decompositions as described herein:

$$\text{Var}(k_i') + \mathbb{E}[k_i']^2 = \frac{1}{12} \frac{(B+2)(B^2 - B + 1)}{B+1}.$$

For a radix decomposition that just uses minus half the radix as a digit but not plus half the radix, it can be determined that $$\text{Var}(k_i') + \mathbb{E}[k_i']^2 = \frac{1}{12}(B^2 + 2).$$

Each digit $k'_i$ is equiprobable in this recoding, e.g., has an occurrence probability of $$\frac{1}{B}.$$

Hence, $$\mathbb{E}[k_i'] = -\frac{1}{2} \text{ and } \text{Var}(k_i') = \frac{1}{12}(B^2 - 1).$$

Thus, BNAF radix decompositions as described herein achieve an improvement of $$\frac{1}{4} \frac{B}{B+1}.$$

The next table displays the difference $$\frac{1}{4} \frac{B}{B+1}$$

for a number of radices B:

| Radix B | 4 | 8 | 16 | ... | ∞ |
| --- | --- | --- | --- | --- | --- |
| Difference | 1/5 | 2/9 | 4/17 | ... | 1/4 |

It may be observed that the advantage of the provided techniques is especially large for larger radices, e.g., for radices of at most four, at least 8, or at least 16. This applies to radices that are not powers of two as well.

It is also noted that an amplified effect is achieved if multiple scalar multiplications are performed, for example, if the results of multiple scalar multiplications are added together. For example, in key switching, the number of scalar multiplications is large and scales both in the number of levels representing the precision of the radix decomposition and in the dimension of the ciphertext (e.g., at least 128, at least 256, or at least 1024, e.g., $10^3 \approx 2^{10}$ at a 128-bit security level), so using the provided techniques is particularly beneficial for key switching, especially with large parameters.

Figure 2B:
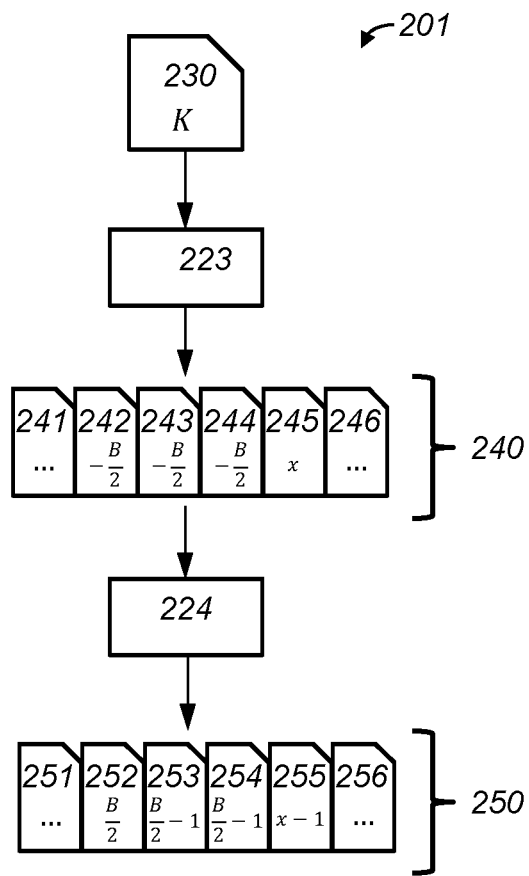
FIG. 2b schematically shows an example of an embodiment of a coefficient determining device.

FIG. 2b schematically shows an example of an embodiment of a coefficient determining device 201, e.g., based on device 110 of any of FIGS. 1a-1c. Device 201 may determine a set of coefficients for use by an encrypted multiplication unit as digits of a radix decomposition 250 with respect to an even radix.

The radix decomposition 250 may be determined in such a way that it ensures that no two subsequent digits are both equal in absolute value to half the radix. To this end, device 201 may first determine a radix decomposition 240 that does not provide this assurance, and then correct radix decomposition 240 to obtain radix decomposition 250.

In particular, shown in the figure is the scalar K, 230, for which a radix decomposition is to be determined. Also shown is a radix decomposition unit 223 that determines a radix decomposition 240 of scalar 230. The digits 241-246 of radix decomposition 240 may lie between minus half the radix, inclusive, and plus half the radix, inclusive. In some cases, unit 223 may use minus half the radix if needed but never uses plus half the radix. For example, radix decomposition unit 223 may apply the algorithm "Signed-digit radix-B recoding (B 4 even, only minus half the radix used)" discussed elsewhere in this specification. In other cases, unit 223 may use plus half the radix if needed but never uses minus half the radix. It is also possible that unit 223 may output radix decompositions using both minus half the radix and plus half the radix.

However, radix decomposition unit 223 is not configured to ensure that no two subsequent digits are both equal in absolute value to half the radix. Thus, for at least some scalars K, radix decomposition unit 223 may output a radix decomposition in which two subsequent digits are equal in absolute value to half the radix.

A decomposition correction unit 224 may be used to determine radix decomposition 250 by correcting radix decomposition 240 to ensure that no two subsequent digits are both equal in absolute value to half the radix. The digits 251-256 of radix decomposition 250 may still lie between minus half the radix, inclusive, and plus half the radix. At least for some scalars 230, at least one of the digits 251-256 may be set to plus half the radix and at least one of the digits 251-256 may be set to minus half the radix.

One way unit 224 may perform the correction is by iterating over digits 241-246 of radix decomposition 240 from least to most significant, e.g., from left to right in the figure. If a current digit of radix decomposition 240 is not equal to either minus half the digit or plus half the digit, it may be left unchanged in the corrected radix decomposition 250.

If a current digit is equal to minus half the digit or plus half the digit in radix decomposition 240, that digit may be selected in radix decomposition 250 from among plus half the radix and minus half the radix based on determining whether this selection results in a subsequent digit being equal in absolute value to half the radix. For example, switching a current digit from minus half the radix to plus half the radix may decrease the subsequent digit by one, and switching a current digit from plus half the radix to minus half the radix may decrease the subsequent digit by one. On the other hand, if no switching is done, the subsequent digit may be the same in radix decomposition 250 as it was in radix decomposition 240. Thus, by selecting a current digit among plus or minus half the radix, it may be avoided that the next digit is equal to plus or minus half the radix as well.

A particular case is illustrated in the figure. In this example, the original radix decomposition 240 comprises multiple subsequent digits 242,243,244 that are each equal to minus half the radix, followed by a digit 245 that is not equal to minus half the radix. When iterating from least to most significant, digit 242 may be encountered first. Since digits 242, 243 are both equal to minus half the radix, digit 242 may be switched to digit 252 equal to plus half the radix. In this case, subsequent digit 243 cannot be reduced by one since it is already equal to minus half the digit. In this case, subsequent digit 243 may be set to digit 253 equal to half the radix minus one instead. Next digit 244 in this example also cannot be reduced by one, since it is already equal to minus half the radix, so it is set to digit 254 equal to half the radix minus one as well. Digit 245 in this example is not equal to minus half the radix, so it can be reduced by one to obtain digit 255.

More generally, a sequence 242-244 of one or more consecutive digits all equal to minus half the digit, followed by a digit 245 that is not equal to minus half the digit, may be corrected to a sequence starting with a digit 252 equal to plus half the radix; followed by zero or more digits 253-254 equal to plus half the radix minus one; followed by a digit 255 equal to the corresponding original digit 245 minus one. This may be realized based on the fact that the forms (b, −B/2, ..., −B/2, −B/2) and (b−1, B/2−1, ..., B/2−1, B/2) are equivalent, where b is not equal to −B/2.

The same principle also applies if the original radix decomposition 240 uses digits equal to plus half the radix instead of digits equal to minus half the radix, for example.

Thus, decomposition correction unit 224 may ensure that no two subsequent digits are both equal in absolute value to half the radix. Interestingly, decomposition correction unit 224 may in addition ensure that a digit that is equal in absolute value to half the radix, is succeeded by a next digit with the same sign as the digit. To this end, decomposition unit 224 may select a digit of the radix decomposition from among plus half the radix and minus half the radix not just based on determining whether this selection results in a subsequent digit being equal in absolute value to half the radix, but also on whether it results in a next digit having the same sign as the digit. Thus, a radix decomposition in BNAF form may be obtained.

This is illustrated in detail in the following example algorithm. The algorithm takes on input a modified radix-B form that does not use plus half the radix, and produces another modified radix-B form with digits in the set $$\left\{-\frac{B}{2}, \ldots, \frac{B}{2}\right\}.$$

---

Algorithm. Radix-B recoding by correcting into a BNAF (B even)

Input: Modified radix-B form $(k'_n, \ldots, k'_0)$ of a non-zero integer $k = \Sigma_{i=0}^{n} k'_i B^i$ with $k'_i \in$ $$\left\{-\frac{B}{2}, \ldots, \frac{B}{2}-1\right\} \text{ and } k'_n \neq 0$$

Output: $(k'_m, \ldots, k'_0)$ with $k'_i \in$ $$\left\{-\frac{B}{2}, \ldots, \frac{B}{2}\right\} \text{ s.t. } \Sigma_{i=0}^{m} k'_i B^i = k$$

$k'_{n+1} \leftarrow 0$
for i = 0 to n do $\text{if } \left[\left[k'_i = -\frac{B}{2}\right] \wedge \left[[k'_{i+1} = > 0] \vee \left[k'_{i+1} = -\frac{B}{2}\right]\right]\right] \vee$ $\left[k'_{i+1} < -\frac{B}{2}\right]$ then $k'_i \leftarrow k'_i + B$
$k'_{i+1} \leftarrow k'_{i+1} - 1$
end if
end for
if $[[k'_n = 0] \wedge [k'_{n+1} = 0]]$ then $i \leftarrow n - 1$
if $[k'_{n+1} \neq 0]$ then $i \leftarrow n + 1$
return $(k'_i, \ldots, k'_0)$

---

Interestingly, it may by observed from this algorithm that turning an input representation into a BNAF, e.g., by ensuring that no two subsequent digits are both equal in absolute value to half the radix and/or a digit that is equal in absolute value to half the radix, is succeeded by a next digit with the same sign as the digit, improves the decomposition in terms of noise development for homomorphic scalar multiplication. Interestingly, in some cases, the resulting representation can also be shorter, e.g., $k'_n=0$, which may make the homomorphic scalar multiplication more efficient to perform.

Figure 4A:
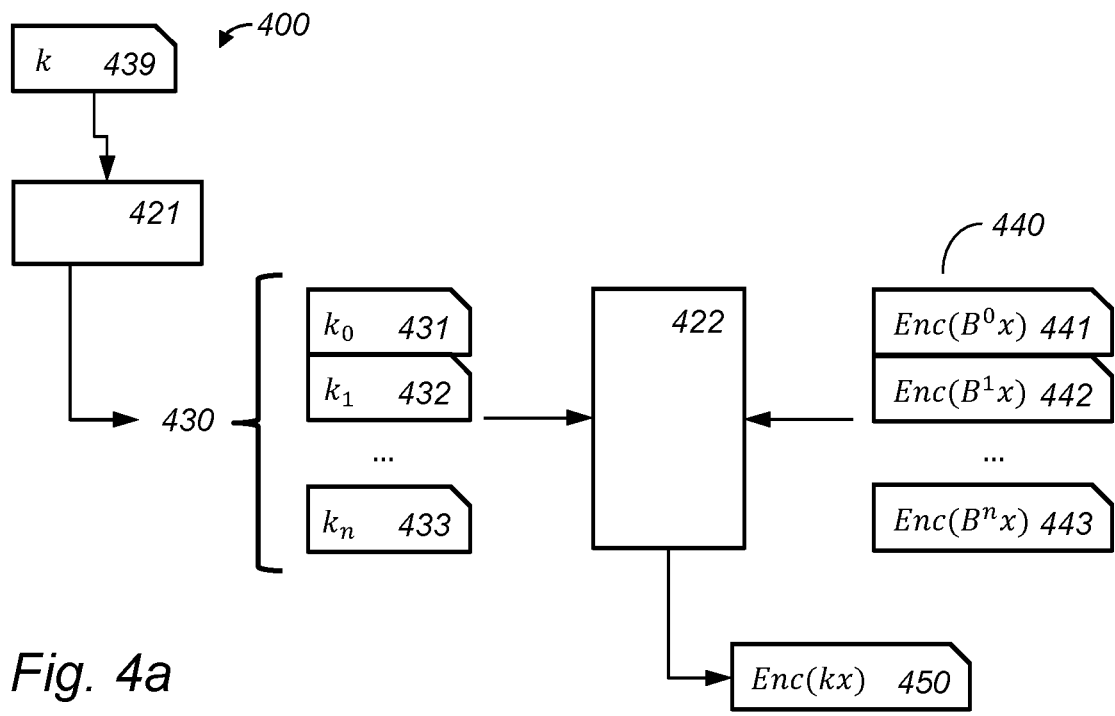
FIG. 4a schematically shows an example of an embodiment of a device for performing a homomorphic scalar multiplication.

FIG. 4a schematically shows an example of an embodiment of a device 400 for performing a homomorphic scalar multiplication. The device 400 may be based on device 110 of FIG. 1a or FIG. 1b, or on device 120 of FIG. 1c, for example.

The device may obtain an encrypted value 440, and a scalar k, 439, with which the encrypted value is to be multiplied. The value that is to be encrypted can be any value that can be homomorphically multiplied by a scalar, e.g., a real number; a real number on the torus [0,1); a polynomial; an integer; etc. The scalar is an integer.

For example, the value may be a modular integer. For instance, when the encrypted value lies on the (discretized) torus, the scalar can be viewed as a modular integer (see e.g. "Programmable Bootstrapping Enables Efficient Homomorphic Inference of Deep Neural Networks"). Mathematically, the real torus [0,1) can be written as the quotient $\mathbb{R}/\mathbb{Z}$ and for any positive integer q the quotient $q^{-1}\mathbb{Z}/\mathbb{Z}$ is an additive subgroup of $\mathbb{E}/\mathbb{Z}$ of order q; hence, for any element t in the discretized torus $q^{-1}\mathbb{Z}/\mathbb{Z}$, the scalar multiplication of t by k or by (k mod q) results in the same value.

The scalar can be positive or negative, e.g., a positive value larger than or equal to the radix or larger than or equal to the radix squared, or a negative value smaller than or equal to minus the radix or smaller than or equal to minus the radix squared. The term "scalar" is used herein as meaning a plain, e.g., unencrypted value. Thus, the device 400 may have access in unencrypted form to the scalar 439 but not to the value 440 that the scalar is multiplied with. The scalar can be a coefficient of a polynomial with which the encrypted value 440 is multiplied, for example. Despite not knowing (or in any case, not using) the value 440 in plain, device 400 is still able to compute an encryption 490 of the value multiplied by the scalar 439.

The device 400 may comprise a radix decomposition unit 421 configured to determine a set of coefficients 430 for the scalar multiplication as a radix decomposition as described herein, e.g., using the techniques of FIG. 2a or of FIG. 2b. However, it is not needed for device 400 to comprise a radix decomposition unit 421: it is also possible for device 400 to obtain the set of coefficients 430 in another way, e.g., as comprised in a homomorphic executable for performing computations on noisy homomorphic ciphertexts.

In order to perform the homomorphic scalar multiplication, device 400 may comprise an encrypted multiplication unit 422. The encrypted multiplication unit 422 may be configured to homomorphically multiply the encrypted value 440 by the scalar 439 based on the set of coefficients 430, thus, obtaining an encryption 450 of the product of the encrypted value and the scalar. The encrypted value 440 may be represented by multiple respective value ciphertexts 441-443. A respective value ciphertext 441,442,443 may be a noisy homomorphic ciphertext encrypting the value x multiplied by a respective power $B^i$ of the radix. Typically, all ciphertexts 441-443 are encryptions under the same key, which can be a symmetric or an asymmetric key. For example, the encryptions can be LWE-type ciphertexts or ciphertexts based on Approx-GCD or NTRU.

For example, device 400 may be configured to receive the value ciphertexts 441-443 from another party, e.g., from a party outsourcing the computation or a party providing key switching material. Device 400 may also compute value ciphertexts 441-443 itself. For example, if repeated multiplication of an encrypted value x with respective scalars is needed, then device 400 may compute respective value encryptions Enc(B$^i$ x) of the encrypted value once and re-use them in respective scalar multiplications. In such cases, it is preferred that device 400 performs a bootstrapping on the respective value encryptions 441-443 before performing the scalar multiplications, in order to reduce the amount of noise resulting from the scalar multiplications.

The encrypted multiplication unit 422 may be configured to homomorphically compute a linear combination of the multiple respective value ciphertexts 441-443 according to respective coefficients 431-433 of the set of coefficients, e.g., $c \to \Sigma_{i=0}^n k_i \, Enc(B^i \, x)$. Interestingly, encrypted multiplication unit 422 can perform this computation without requiring a decryption key for the homomorphic ciphertexts. Computing such a linear combination under encryption is known per se. For example, a multiplication of a value ciphertext 441-443 by a coefficient 431-433 may be implemented by repeated addition or in other known ways.

The computation of the linear combination may involve multiplying respective value ciphertexts 441-443 by respective coefficients 431-433 from the set of coefficients, e.g., computing $k_i \cdot Enc(B^i x)$. Interestingly, these respective multiplications may be performed at least in part in parallel, for example, using a dedicated processing unit such as a GPU or FPGA to perform the multiplications or operations that are part of them. Thus, by dividing a large multiplication into respective scalar multiplications by smaller numbers, parallelizability and thus performance is improved, and better use can be made of the dedicated processing unit.

The example of this figure may be readily extended to a homomorphic multiplication of the encrypted value by a polynomial k+k'x+ . . . . Such a homomorphic multiplication may be implemented based on radix decompositions of the respective coefficients k,k', . . . of the polynomial. For example, scalar 439 may represent the constant coefficient k of the polynomial, and may be extended with additional coefficients k', . . . of the polynomial. A digit $k_i$, 431-433, of the radix decomposition of the constant coefficient k may be extended to a polynomial $k_i + k'_i x + \ldots$ comprising digits for the respective coefficients k,k', . . . . Thus, polynomials 431-433 may be determined by determining radix decompositions of the respective coefficients of the polynomial as described herein. The homomorphic multiplication may be performed by homomorphically multiplying the value ciphertexts 441-443 by the respective polynomials 431-433. Thus, in this case, the homomorphic multiplication of the encrypted value by the constant coefficient k, and homomorphic multiplications by other coefficients k' of the polynomial, are sub-operations of the homomorphic multiplication of the encrypted value by the polynomial.

Figure 4B:
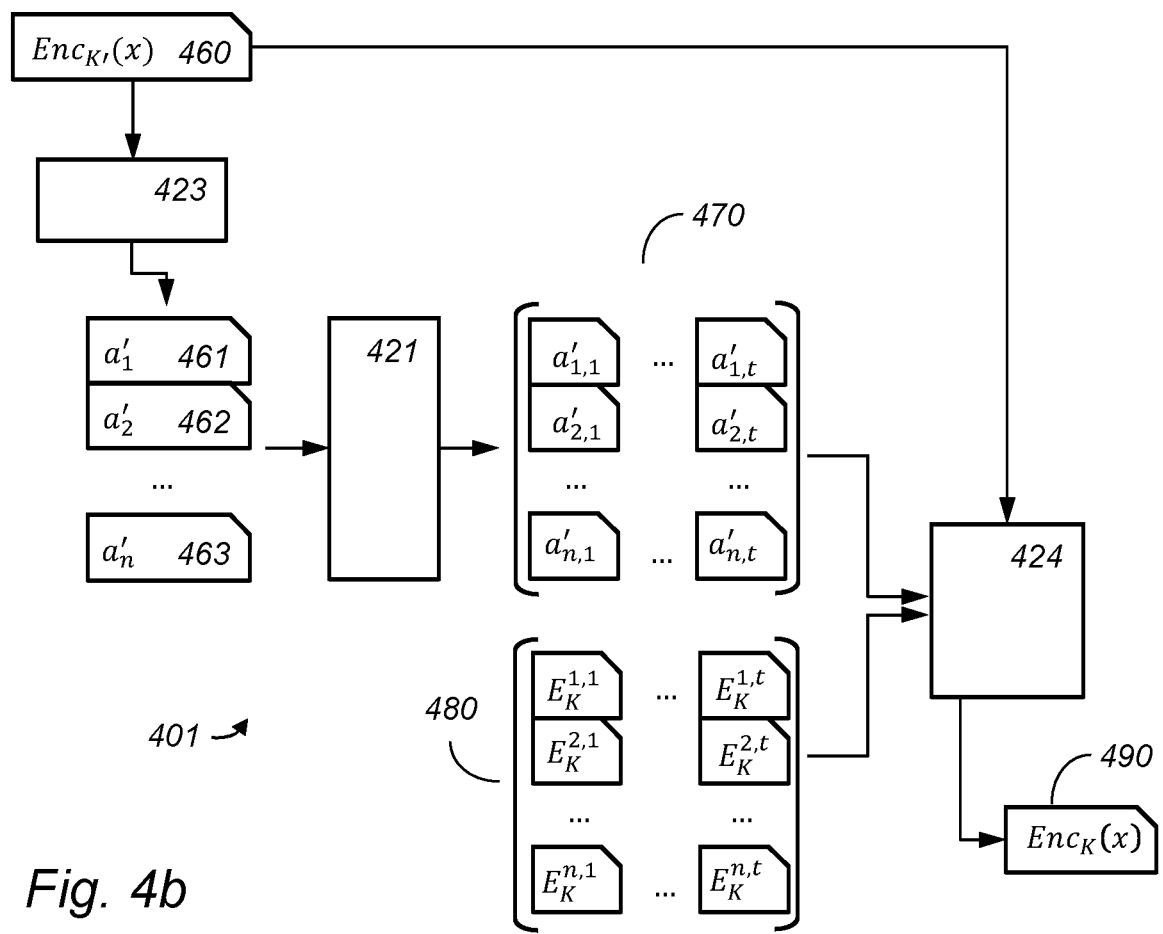
FIG. 4b schematically shows an example of an embodiment of a device for performing a key switching for homomorphic ciphertexts.

FIG. 4b schematically shows an example of an embodiment of a device 401 for performing a key switching for noisy homomorphic ciphertext. The device 401 may be based on device 110 of FIG. 1a or FIG. 1b, for example.

Device 401 may be configured to obtain a source ciphertext 460. The source ciphertext 460 may be a noisy homomorphic encryption encrypting a source encrypted value under a source encryption key. Device 401 may determine a target ciphertext 490 encrypting the same source encrypted value, but under a different target encryption key. This determining of an encryption of the same value under a different key is also referred to as key switching. By using the techniques provided herein, a target ciphertext 490 may be obtained with less noise.

As a concrete example, the provided techniques may be used in the key switching technique provided in Algorithm 2 of "TFHE: Fast fully homomorphic encryption over the torus". In particular, the techniques may be used to perform TLWE-to-TLWE key switching, e.g., N=1 in Algorithm 2 of the paper.

Key switching may be performed based on computing, under encryption, a linear combination of one or more key switching values. Device 401 may obtain key switching information 480 comprising these respective key switching values in encrypted form. A respective key switching value ciphertext may be a noisy homomorphic ciphertext encrypting the key switching value, also referred to as a key digit, multiplied by a respective power of a radix under a target encryption key. Key-switching value ciphertext are also referred to as key-switching keys. In "TFHE: Fast fully homomorphic encryption over the torus", the key-switching keys are denoted $KS_{i,j}$.

Device 401 may comprise a coefficient computing unit 423 that may determine, from the source ciphertext, respective coefficients $a_i'$ 461-463 for the respective encrypted key switching values 480. The way this is done depends on the exact key switching procedure to be applied. Device 401 may further comprise a radix decomposition unit 421. The radix decomposition unit 421 may determine respective sets of coefficients $a'_{i,1}, \ldots, a'_{i,t}$ corresponding to respective coefficients $a'_i$ as described herein. A set of coefficients may be used for multiplying an encrypted key switching value by a coefficient 461-463. Thus, the coefficient computing unit 423 and the radix decomposition unit 421 together may determine respective coefficients $a'_{i,j}$ to be multiplied with key switching value ciphertexts $E_K^{i,j}$.

In the paper "TFHE: Fast fully homomorphic encryption over the torus", for example, coefficients $\tilde{a}_{i,j}$ are determined, to be multiplied with key switching keys $KS_{i,j}$. These coefficients are determined as a bit decomposition $\tilde{a}=\Sum_{j=1}^{t}\tilde{a}_{i,j}\cdot 2^{-j}=2^{-t}\Sum_{j=1}^{t}\tilde{a}_{i,j}\cdot 2^{t-j}$ of $2^t\tilde{a}$. In the case of TLWE-to-TLWE key switching, coefficients $\tilde{a}_{i,j}$ are bits. This computation of coefficients may be improved using the provided techniques by having radix decomposition unit 421 compute coefficients $a'_{i,j}$ as a radix-2 radix decomposition of $2^t\tilde{a}$ as described herein, where −1 is allowed as a coefficient as well as +1. This technique can also be applied to higher radices where a is decomposed as $\tilde{a}=\Sum_{j=1}^{t}\tilde{a}_{i,j}\cdot B^{-j}$ for an arbitrary radix B>2.

Device 401 may further comprise a target ciphertext computation unit 424 that computes target ciphertext 490, including homomorphically multiplying the respective encrypted key switching values 480 by the respective coefficients 470 as described herein, e.g., using an encrypted multiplication unit as described herein. For example, in the key switching procedure of "TFHE: Fast fully homomorphic encryption over the torus", the target ciphertext 490 may be computed as $(0, f(b^{(1)}, \ldots, b^{(p)}))-\Sum_{i=1}^{n}\Sum_{j=1}^{t} a'_{i,j}\cdot KS_{i,j}$, using coefficients $a'_{i,j}$ instead of the coefficients $\tilde{a}_{i,j}$ of the original algorithm.

Various other key switching techniques may be similarly improved using the provided techniques. In particular, key switching may involve multiply in the key-switching values by polynomials. This may involve multiplying the key-switching values by scalars, e.g., by the constant coefficient of the polynomial, as a sub-operation that may be performed as described in this figure. For example, the key switching techniques of "TFHE: Fast fully homomorphic encryption over the torus" may be used for TLWE-to-TRLWE key switching, where the coefficients $\tilde{a}_{i,j}$ are polynomials. The example of this figure can be readily generalized to improve this key switching procedure as well, e.g., a radix decomposition may be determined as described herein for each of the coefficients of a polynomial, and these radix decompositions may be used to perform the multiplication by the polynomial.

Instead of or in addition to using polynomials, also radices higher than two may be used in key switching. In such cases, radix decompositions with radix higher than two may be determined for respective coefficients by which respective key-switching values are to be multiplied. An adaptation of the key switching of "TFHE: Fast fully homomorphic encryption over the torus" to higher radices is described in "Programmable Bootstrapping Enables Efficient Homomorphic Inference of Deep Neural Networks", for example. The provided techniques can be used to improve the radix decompositions used in that key switching procedure as well.

Figure 5A:
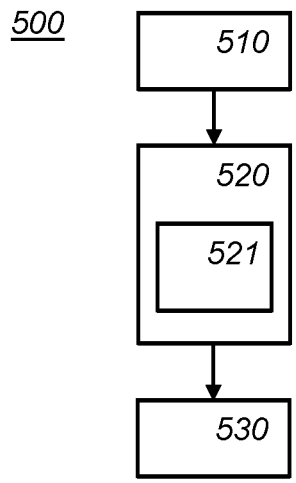
FIG. 5a schematically shows an example of an embodiment of a method of determining a set of coefficients for use by an encrypted multiplication unit.

FIG. 5a schematically shows an example of an embodiment of a method 500 of determining a set of coefficients for use by an encrypted multiplication unit. The encrypted multiplication unit may be configured to homomorphically multiply an encrypted value by a scalar. The encrypted value may be represented by multiple respective value ciphertexts. A respective value ciphertext is a noisy homomorphic ciphertext encrypting the value multiplied by a respective power of a radix. The encrypted multiplication unit may be configured to homomorphically compute a linear combination of the multiple respective value ciphertexts according to the set of coefficients. The encrypted multiplication itself is not part of method 500.

The method 500 may comprise obtaining 510 the scalar and the radix. The radix may be even.

The method 500 may comprise determining 520 the set of coefficients as digits of a radix decomposition of the scalar with respect to the radix. The determined digits may lie between minus half the radix, inclusive, and plus half the radix, inclusive. The determining 520 may comprises ensuring 521 that no two subsequent digits are both equal in absolute value to half the radix.

The method 500 may comprise providing 530 the set of coefficients to the encrypted multiplication unit for homomorphically multiplying the encrypted value by the scalar.

Figure 5B:
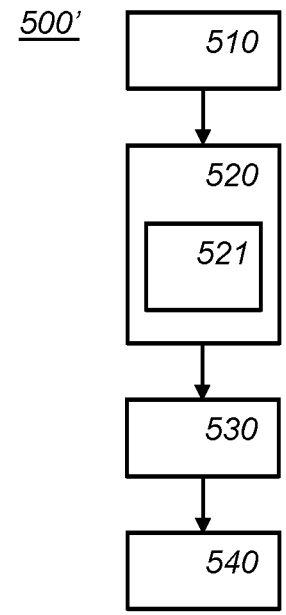
FIG. 5b schematically shows an example of an embodiment of a method of performing a homomorphic scalar multiplication of an encrypted value.

FIG. 5b schematically shows an example of an embodiment of a method 500' of performing a homomorphic scalar multiplication of an encrypted value. The method 500' is the same as method 500 of FIG. 5a, except that method 500' further comprises, by the encrypted multiplication unit, homomorphically multiplying 540 the encrypted value by the scalar by homomorphically computing the linear combination of the multiple respective value ciphertexts according to the set of coefficients.

Figure 6:
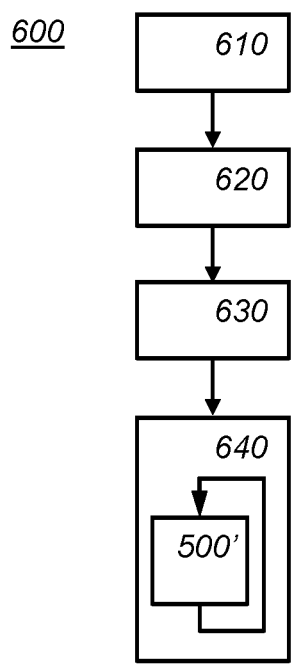
FIG. 6 schematically shows an example of an embodiment of a key switching method.

FIG. 6 schematically shows an example of an embodiment of a key switching method 600 for noisy homomorphic ciphertexts The method 600 may comprise obtaining 610 key switching information comprising respective encrypted key-switching values, e.g., key digits. An encrypted key-switching value may be represented by multiple respective key-switching value ciphertexts. A respective key-switching value ciphertext may be a noisy homomorphic ciphertext encrypting the key switching value, e.g., the key digit, multiplied by a respective power of a radix under a target encryption key.

The method 600 may comprise obtaining 620 a source ciphertext. The source ciphertext may be a noisy homomorphic encryption encrypting a source encrypted value under a source encryption key.

The method 600 may comprise determining 630 from the source ciphertext respective coefficients for the respective encrypted key-switching values.

The method 600 may comprise computing 640 a target ciphertext encrypting the source encrypted value under the target encryption key. The computing 640 may comprise homomorphically multiplying 500' respective encrypted key switching values by the respective coefficients according to a method as described herein, e.g., method 500' of FIG. 5b.

Figure 7:
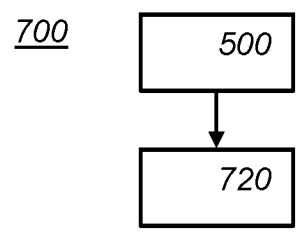
FIG. 7 schematically shows an example of an embodiment of a method of compiling a computation into a homomorphic executable.

FIG. 7 schematically shows an example of an embodiment of a method 700 of compiling a computation into a homomorphic executable. The homomorphic executable may be executable by an encrypted computation engine. The homomorphic executable may cause the encrypted computation engine to perform the computation on noisy homomorphic ciphertexts. The computation may comprise multiplying a value by a scalar.

The method 700 may comprising determining 500 coefficients for use in homomorphically multiplying the value as an encrypted value by the scalar according to a method described herein, e.g., method 500 of FIG. 5a.

The method 700 may comprise including 720 in the homomorphic executable one or more instructions for homomorphic scalar multiplying the encrypted value by the scalar. The one or more instructions may comprise the determined coefficients.

Many different ways of executing the methods 500,500', 600,700 are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the methods may be executed using software, which comprises instructions for causing a processor system to perform method 500, 500', 600, or 700. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

Typically, the devices described herein, e.g., in FIG. 1a-1c, comprise one or more microprocessors which executes appropriate software stored at the system; for example, that software may have been downloaded and/or stored in a corresponding memory, e.g., a volatile memory such as RAM or a non-volatile memory such as Flash.

Alternatively, the systems may, in whole or in part, be implemented in programmable logic, e.g., as field-programmable gate array (FPGA). The systems may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, the systems may comprise circuits for the evaluation of cryptographic primitives.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 8A:
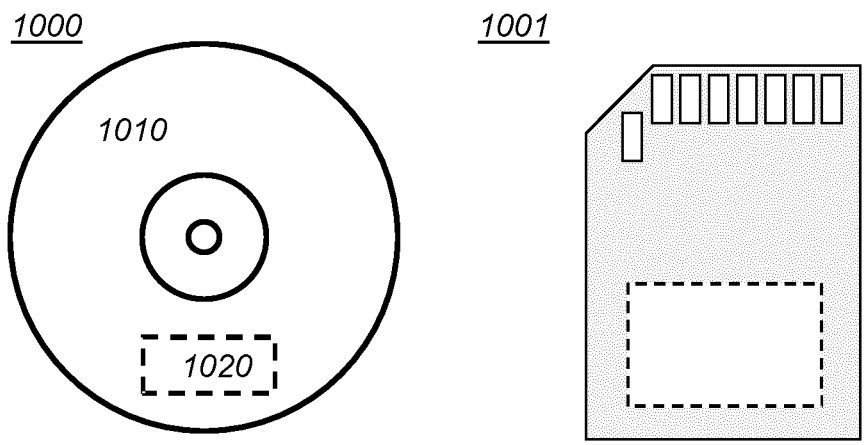
FIG. 8a schematically shows a computer readable medium having a writable part comprising a computer program according to an embodiment.

FIG. 8a shows a computer readable medium 1000 having a writable part 1010, and a computer readable medium 1001 also having a writable part. Computer readable medium 1000 is shown in the form of an optically readable medium. Computer readable medium 1001 is shown in the form of an electronic memory, in this case a memory card. Computer readable medium 1000 and 1001 may store data 1020 wherein the data may indicate instructions, which when executed by a processor system, cause a processor system to perform an embodiment of a blind rotation method, according to an embodiment. Instead or in addition, the data may represent a homomorphic executable into which a computation is compiled as described herein.

The data 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method of determining coefficients.

Figure 8B:
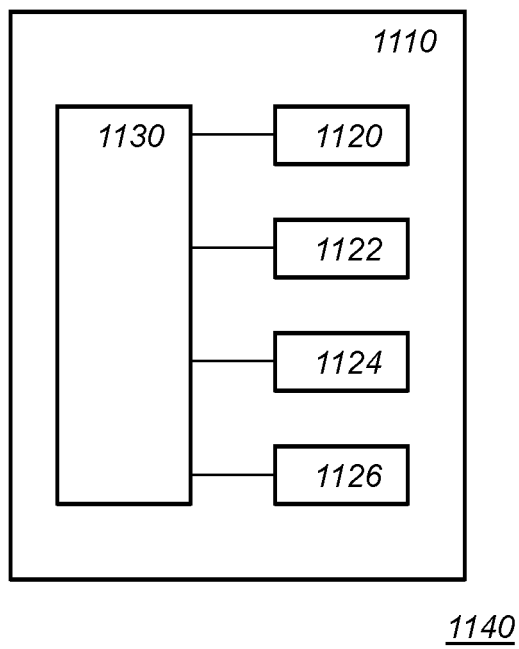
FIG. 8b schematically shows a representation of a processor system according to an embodiment.

FIG. 8b shows in a schematic representation of a processor system 1140 according to an embodiment of a device for determining a set of coefficients. The processor system comprises one or more integrated circuits 1110. The architecture of the one or more integrated circuits 1110 is schematically shown in FIG. 6b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the device for determining a set of coefficients, may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex MO. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

While device 1110 is shown as including one of each described component, the various components may be duplicated in various embodiments. For example, the processor 1120 may include multiple microprocessors that are configured to independently execute the methods described herein or are configured to perform steps or subroutines of the methods described herein such that the multiple processors cooperate to achieve the functionality described herein. Further, where the device 1110 is implemented in a cloud computing system, the various hardware components may belong to separate physical systems. For example, the processor 1120 may include a first processor in a first server and a second processor in a second server.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A computer-implemented method for an encrypted computation engine configured to perform a sequence of homomorphic encryption operations, including an arithmetic operation on an encrypted value, the method comprising
   (i) receiving the encrypted value from a data-provider, a and running one of the homomorphic encryption operations of the sequence of homomorphic encryption operations on the received encrypted value, wherein the encrypted value is represented by multiple respective value ciphertexts, wherein a respective value ciphertext is a noisy homomorphic ciphertext encrypting a value multiplied by a respective power of a radix,
   (ii) obtaining a set of coefficients for use by an encrypted multiplication unit of the encrypted computation engine, wherein the set of coefficients comprises digits of a radix decomposition of a scalar with respect to the radix, wherein the radix is even, and the digits lie between minus half the radix, inclusive, and plus half the radix, inclusive, and wherein no two subsequent digits are both equal in absolute value to half the radix, and
   (iii) homomorphically multiplying, by the encrypted multiplication unit, the encrypted value by the scalar by homomorphically computing a linear combination of the multiple respective value ciphertexts according to the set of coefficients; and
   (iv) transmitting to the data provider said homomorphic multiplication of the encrypted value by the scalar and/or a result of further homomorphic encryption operations of the sequence of homomorphic encryption operations applied to the homomorphic multiplication of the encrypted value by the scalar.

2. The method of claim 1, wherein at least one digit of the radix decomposition is set to half the radix and setting at least one further digit of the radix decomposition is set to minus half the radix.

3. The method of claim 1, wherein the value ciphertexts are Learning With Errors (LWE)-type ciphertexts.

4. The method of claim 1, wherein the radix is a power of 2.

5. The method of claim 1, wherein homomorphically computing the linear combination comprises multiplying the multiple respective value ciphertexts by respective coefficients from the set of coefficients, said multiplications being performed at least in part in parallel.

6. The method of claim 1, wherein the radix is a power of at least 4.

7. The method of claim 1, wherein the radix is a power of at least 8.

8. A computer-implemented key-switching method for key switching of noisy homomorphic ciphertexts from a source encryption key to a target encryption key, the method comprising:
   (a) obtaining key-switching information comprising respective encrypted key-switching values, an encrypted key-switching value being represented by multiple respective key switching value ciphertexts, wherein a respective key-switching value ciphertext is a noisy homomorphic ciphertext encrypting the key-switching value multiplied by a respective power of a radix under the target encryption key;
   (b) obtaining a source ciphertext, wherein the source ciphertext is a noisy homomorphic encryption encrypting a source encrypted value under the source encryption key;
   (c) determining from the source ciphertext respective coefficients for the respective encrypted key-switching values; and
   (d) computing a target ciphertext encrypting the source encrypted value under the target encryption key, comprising homomorphically multiplying the respective encrypted key-switching values by the respective coefficients according to the method of claim 1.

9. A non-transitory computer readable medium comprising data representing instructions, which when executed by a processor system, cause the processor system to perform the method according to claim 1.

10. The method of claim 1, wherein the method comprises training a machine-learning model on encrypted data items without access to the plain data items, and/or evaluating a trained machine-learning model on an encrypted input.

11. The method of claim 10, wherein the model comprises a neural network.

12. A computer-implemented method of compiling a computation into a homomorphic executable, wherein the homomorphic executable is executable by an encrypted computation engine and causes the encrypted computation engine to perform the computation on noisy homomorphic ciphertexts, wherein the computation comprises multiplying an encrypted value by a scalar, the method comprising:

(i) determining coefficients for use in homomorphically multiplying the encrypted value by the scalar by determining a set of coefficients for use by an encrypted multiplication unit of the encrypted computation engine, wherein the encrypted multiplication unit is configured to homomorphically multiply the encrypted value by the scalar, wherein the encrypted value is represented by multiple respective value ciphertexts, wherein a respective value ciphertext is a noisy homomorphic ciphertext encrypting a the value multiplied by a respective power of a radix, and wherein the encrypted multiplication unit is configured to homomorphically compute a linear combination of the multiple respective value ciphertexts according to the set of coefficients, the method comprising:

(ii) obtaining the scalar and the radix, wherein the radix is even;

(iii) determining the set of coefficients as digits of a radix decomposition of the scalar with respect to the radix, wherein the determined digits lie between minus half the radix, inclusive, and plus half the radix, inclusive, and wherein said determining comprises ensuring that no two subsequent digits are both equal in absolute value to half the radix;

(iv) providing the set of coefficients to the encrypted multiplication unit for homomorphically multiplying the encrypted value by the scalar; and (v) including in the homomorphic executable one or more instructions for homomorphically multiplying the encrypted value by the scalar, wherein the one or more instructions comprise the determined coefficients.

13. The method of claim 12, comprising setting at least one digit of the radix decomposition to half the radix and setting at least one further digit of the radix decomposition to minus half the radix.

14. The method of claim 12, wherein said ensuring comprises selecting a digit of the radix decomposition from among plus half the radix and minus half the radix based on determining whether said selection results in a subsequent digit being equal in absolute value to half the radix.

15. The method of claim 12, comprising ensuring that a digit that is equal in absolute value to half the radix, is succeeded by a next digit with the same sign as the digit.

16. The method of claim 12, comprising determining a digit of the radix decomposition from a current scalar; determining a next scalar from the current scalar and the digit; and determining a radix decomposition of the next scalar.

17. The method of claim 16, comprising selecting the digit from among plus the radix and minus half the radix, wherein said selecting comprises:

selecting plus half the radix if selecting minus half the radix would result in the next scalar being equal to half the radix modulo the radix;

selecting minus half the radix if selecting plus half the radix would result in the next scalar being equal to half the radix modulo the radix.

18. The method of claim 16, comprising selecting the digit from among plus the radix and minus half the radix, wherein said selecting comprises selecting plus half the radix if this results in the next scalar being smaller than half the radix modulo the radix, and selecting minus half the radix otherwise.

19. The method of claim 12, wherein the value ciphertexts are Learning With Errors (LWE)-type ciphertexts.

20. The method of claim 12, wherein the radix is a power of 2.

21. The method of claim 12, where in the radix is a power of at least 4.

22. The method of claim 12, where in the radix is a power of at least 8.

23. The method of claim 12, wherein homomorphically computing the linear combination comprises multiplying the multiple respective value ciphertexts by respective coefficients from the set of coefficients, said multiplications being performed at least in part in parallel in the homomorphic executable.

24. A non-transitory computer readable medium comprising data representing a homomorphic executable into which a computation is compiled according to the computer-implemented method according to claim 12.

25. An encrypted computation engine device configured to perform a sequence of homomorphic encryption operations, including an arithmetic operation on an encrypted value, the encrypted computation engine device comprising: one or more processors; and one or more storage devices storing instructions that, when executed by the one or more processors, cause the one or more processors to perform operations for (i) receiving the encrypted value from a data-provider, a and running one of the homomorphic encryption operations of the sequence of homomorphic encryption operations being run on the received encrypted value, wherein the encrypted value is represented by multiple respective value ciphertexts, wherein a respective value ciphertext is a noisy homomorphic ciphertext encrypting a the value multiplied by a respective power of a radix, (ii) obtaining determining a set of coefficients for use by an encrypted multiplication unit of the encrypted computation engine, wherein the set of coefficients comprises digits of a radix decomposition of a scalar with respect to the radix, wherein the radix is even, and the digits lie between minus half the radix, inclusive, and plus half the radix, inclusive, and wherein no two subsequent digits are both equal in absolute value to half the radix, (iii) homomorphically multiplying the encrypted value by the scalar by homomorphically computing a linear combination of the multiple respective value ciphertexts according to the set of coefficients; and (iv) transmitting to the data provider said homomorphic multiplication of the encrypted value by the scalar and/or a result of further homomorphic encryption operations of the sequence of homomorphic encryption operations applied to the homomorphic multiplication of the encrypted value by the scalar.

* * * * *